US012724242B2

(12) United States Patent
Xu et al.

(10) Patent No.: US 12,724,242 B2
(45) Date of Patent: Sep. 1, 2026

(54) CAMERA OPTICAL LENS

(71) Applicant: AAC OPTICS (CHANGZHOU) CO., LTD., Changzhou (CN)

(72) Inventors: Minyi Xu, Changzhou (CN); Shunda Zhou, Changzhou (CN)

(73) Assignee: AAG OPTICS (CHANGZHOU) CO., LTD., Changzhou (CN)

( * ) Notice: Subject to any disclaimer, the term of this patent is extended or adjusted under 35 U.S.C. 154(b) by 277 days.

(21) Appl. No.: 18/733,827

(22) Filed: Jun. 4, 2024

(65) Prior Publication Data

US 2025/0284096 A1 Sep. 11, 2025

Related U.S. Application Data

(63) Continuation of application No. PCT/CN2024/080087, filed on Mar. 5, 2024.

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2023/0314771 A1 * 10/2023 Hsueh ................ G02B 13/0045 359/708

* cited by examiner

*Primary Examiner* — Nathanael R Briggs
(74) *Attorney, Agent, or Firm* — Wlersch Law Group

(57) ABSTRACT

Disclosed is a camera optical lens. The camera optical lens includes from an object side to an image side in sequence: a first lens, a second lens, a third lens, a fourth lens, a fifth lens, a sixth lens, a seventh lens, and an eighth lens. The camera optical lens satisfies the following conditions: $1.00 \leq d3/d1 \leq 3.00$; $0.20 \leq R3/R4 \leq 0.90$; $1.00 \leq f4/f3 \leq 4.00$; $0.50 \leq f6/f7 \leq 1.40$; $1.80 \leq nd8 \leq 2.20$. The thicknesses on-axis of the first lens and the second lens are d1 and d3, respectively. The curvature radius of the object side surface and image side surface of the second lens are R3 and R4, respectively. The focal lengths of the third lens, the fourth lens, the sixth lens, and the seventh lens are f3, f4, f6, and f7, respectively. The refractive index of the eighth lens is nd8. The camera optical lens has good optical performance and is characterized by a large aperture and miniaturization.

20 Claims, 11 Drawing Sheets

5.14
4.0
2.0
0
Image Height (mm)
470nm
555nm
610nm
510nm
650nm
-10.0 -8.0 -6.0 -4.0 -2.0 0 2.0 4.0 6.0 8.0 10.0
μm

CAMERA OPTICAL LENS

CROSS REFERENCE TO RELATED APPLICATIONS

This application claims priority to Chinese Patent Application No. The present application is a continuation of PCT Patent Application No. PCT/CN2024/080087, entitled "CAMERA OPTICAL LENS," filed Mar. 5, 2024, which is incorporated by reference herein in its entirety.

TECHNICAL FIELD

The present disclosure relates to the field of optical technology, in particular to a camera optical lens.

BACKGROUND

LIDAR (Light detection and ranging) is a radar system that detects the position, velocity, and other characteristics of a target by transmitting a laser beam. It is a system that integrates laser, Global Positioning system (GPS), and inertial navigation system (INS) technologies for acquiring data and generating an accurate digital elevation model (DEM) of the ground. The basic working principle of LIDAR is as follows: the detected signal (laser beam) is transmitted to the target, then the received signal reflected from the target (target echo) is compared with the transmitted signal, and after appropriate processing, relevant information about the target can be obtained, such as the target's distance, azimuth, altitude, speed, attitude, uniform shape, and other parameters, which can be used to detect, track, and identify the target, including aircraft and missiles. The sensor emits tens or hundreds of thousands of laser pulses per second, the timer starts when a light pulse is emitted and stops when the light pulse (reflected from the first person/object) returns, the distance between the sensor and the person/object is calculated by measuring the time of flight (TOF) of the light pulse.

Although the existing lens mounted on the vehicle lidar has good optical performance, the setting of the focal length of the lens still has certain irrationality. As a result, the lens structure can not meet the design requirements of large aperture and miniaturization while having good optical performance.

SUMMARY

An object of embodiments of the present disclosure is to provide a camera optical lens, which can have good optical performance, and meet the design requirements for large aperture and miniaturization.

To resolve the foregoing technical problems, the present disclosure provides a camera optical lens, the camera optical lens from the object side to the image side in sequence includes a first lens, a second lens, a third lens, a fourth lens, a fifth lens, a sixth lens, a seventh lens, and an eighth lens. The camera optical lens satisfies the following conditions: $1.00 \leq d3/d1 \leq 3.00$; $0.20 \leq R3/R4 \leq 0.90$; $1.00 \leq f4/f3 \leq 4.00$; $0.50 \leq f6/f7 \leq 1.40$; $1.80 \leq nd8 \leq 2.20$. d1 represents a thickness on-axis of the first lens. d3 represents a thickness on-axis of the second lens. R3 represents a curvature radius of the object side surface of the second lens. R4 represents a curvature radius of the image side surface of the second lens. f3 represents a focal length of the third lens. f4 represents a focal length of the fourth lens. f6 represents a focal length of the sixth lens. f7 represents a focal length of the seventh lens. nd8 represents a refractive index of the eighth lens.

As an improvement, wherein the camera optical lens further satisfies the following conditions: $|f8/f| \leq 3.00$; where, f8 represents a focal length of the eighth lens; f represents a focal length of the camera optical lens.

As an improvement, wherein the camera optical lens has a field of view; and the camera optical lens further satisfies the following conditions: $(FOV^*f)/IH \geq 95$; where, FOV represents the field of view of the camera optical lens; f represents a focal length of the camera optical lens; IH represents an image height of the camera optical lens.

As an improvement, wherein the camera optical lens further satisfies the following conditions: $(FOV^*f)/IH \leq 125$.

As an improvement, wherein the first lens has a negative refractive power, and the first lens has a concave image side surface at a proximal axis; wherein the camera optical lens further satisfies the following conditions: $0.44 \leq (R1+R2)/(R1-R2) \leq 5.87$; $-7.27 \leq f1/f \leq -0.83$; $0.01 \leq d1/TTL \leq 0.05$; where, R1 represents a curvature radius of the object side surface of the first lens; R2 represents a curvature radius of the image side surface of the first lens; f1 represents a focal length of the first lens; f represents a focal length of the camera optical lens; TTL represents a total optical length of the camera optical lens.

As an improvement, wherein the second lens has a positive refractive power, and the second lens has a convex object side surface at a proximal axis and a concave image side surface at a proximal axis; wherein the camera optical lens further satisfies the following conditions: $-34.47 \leq (R3+R4)/(R3-R4) \leq -1.01$; $3.18 \leq f2/f \leq 17.23$; $0.01 \leq d3/TTL \leq 0.08$; where, f2 represents a focal length of the second lens; f represents a focal length of the camera optical lens; TTL represents a total optical length of the camera optical lens.

As an improvement, wherein the third lens has a positive refractive power, and the third lens has a convex object side surface at a proximal axis and a convex image side surface at a proximal axis; wherein the camera optical lens further satisfies the following conditions: $0.01 \leq (R5+R6)/(R5-R6) \leq 0.62$; $0.47 \leq f3/f \leq 2.47$; $0.03 \leq d5/TTL \leq 0.22$; where, R5 represents a curvature radius of the object side surface of the third lens; R6 represents a curvature radius of the image side surface of the third lens; f represents a focal length of the camera optical lens; d5 represents a thickness on-axis of the third lens; TTL represents a total optical length of the camera optical lens.

As an improvement, wherein the fourth lens has a positive refractive power, and the fourth lens has a convex object side surface at a proximal axis and a convex image side surface at a proximal axis; wherein the camera optical lens further satisfies the following conditions: $-1.98 \leq (R7+R8)/(R7-R8) \leq 1.12$; $0.76 \leq f4/f \leq 5.61$; $0.01 \leq d7/TTL \leq 0.23$; where, R7 represents a curvature radius of the object side surface of the fourth lens; R8 represents a curvature radius of the image side surface of the fourth lens; f represents a focal length of the camera optical lens; d7 represents a thickness on-axis of the fourth lens; TTL represents a total optical length of the camera optical lens.

As an improvement, wherein the fifth lens has a negative refractive power, and the fifth lens has a concave object side surface at a proximal axis and a concave image side surface at a proximal axis; wherein the camera optical lens further satisfies the following conditions: $-0.99 \leq (R9+R10)/(R9-R10) \leq 1.45$; $-3.48 \leq f5/f \leq -0.45$; $0.00 \leq d9/TTL \leq 0.28$; where, R9 represents a curvature radius of the object side surface of the fifth lens; R10 represents a curvature radius of the image side surface of the fifth lens; f represents a focal length of the camera optical lens; d9 represents a thickness on-axis of the fifth lens; TTL represents a total optical length of the camera optical lens.

As an improvement, wherein the sixth lens has a positive refractive power, and the sixth lens has a convex object side surface at a proximal axis; wherein the camera optical lens further satisfies the following conditions: $-2.00 \leq (R11+R12)/(R11-R12) \leq 0.22$; $1.00 \leq f6/f \leq 5.66$; $0.01 \leq d11/TTL \leq 0.14$; where, R11 represents a curvature radius of the object side surface of the sixth lens; R12 represents a curvature radius of the image side surface of the sixth lens; f represents a focal length of the camera optical lens; d11 represents a thickness on-axis of the sixth lens; TTL represents a total optical length of the camera optical lens.

As an improvement, wherein the seventh lens has a positive refractive power, and the seventh lens has a convex object side surface at a proximal axis; wherein the camera optical lens further satisfies the following conditions: $-11.16 \leq (R13+R14)/(R13-R14) \leq -0.01$; $0.89 \leq f7/f \leq 10.88$; $0.01 \leq d13/TTL \leq 0.30$; where, R13 represents a curvature radius of the object side surface of the seventh lens; R14 represents a curvature radius of the image side surface of the seventh lens; f represents a focal length of the camera optical lens; d13 represents a thickness on-axis of the seventh lens; TTL represents a total optical length of the camera optical lens.

As an improvement, wherein the eighth lens has a negative refractive power, and the eighth lens has a concave object side surface at a proximal axis; wherein the camera optical lens further satisfies the following conditions: $-12.50 \leq (R15+R16)/(R15-R16) \leq 0.02$; $0.01 \leq d15/TTL \leq 0.05$; where, R15 represents a curvature radius of the object side surface of the eighth lens; R16 represents a curvature radius of the image side surface of the eighth lens; d15 represents a thickness on-axis of the eighth lens; TTL represents a total optical length of the camera optical lens.

As an improvement, wherein the first lens is made of glass material.

As an improvement, wherein the second lens is made of glass material.

As an improvement, wherein the third lens is made of glass material.

As an improvement, wherein the fourth lens is made of glass material.

As an improvement, wherein the fifth lens is made of glass material.

As an improvement, wherein the sixth lens is made of glass material.

As an improvement, wherein the seventh lens is made of glass material.

As an improvement, wherein the eighth lens is made of glass material.

The beneficial effect of the present disclosure are as follows. The camera optical lens designed according to the present disclosure has excellent optical characteristics, and the camera optical lens can meet the design requirements for large aperture and miniaturization. The camera optical lens is particularly suitable for vehicle-mounted Lidar, cellular phone camera lens assemblies and WEB camera lenses, which includes camera elements such as CCD (Charge-Coupled Device), CMOS (Complementary Metal-Oxide-Semiconductor) and other camera elements for high pixels.

BRIEF DESCRIPTION OF THE DRAWINGS

In order to more clearly illustrate the technical solutions in the embodiments of the present disclosure, the accompanying drawings to be used in the description in the embodiments will be briefly introduced hereinafter, and the following is a brief introduction of the drawings required in the description of the embodiments. It is obvious that the accompanying drawings in the description hereinafter are only some of the embodiments of the present disclosure, and that for a person having ordinary skill in the art, other accompanying drawings can also be obtained according to these drawings without creative labor.

DETAILED DESCRIPTION OF THE EMBODIMENTS

Figure 1:
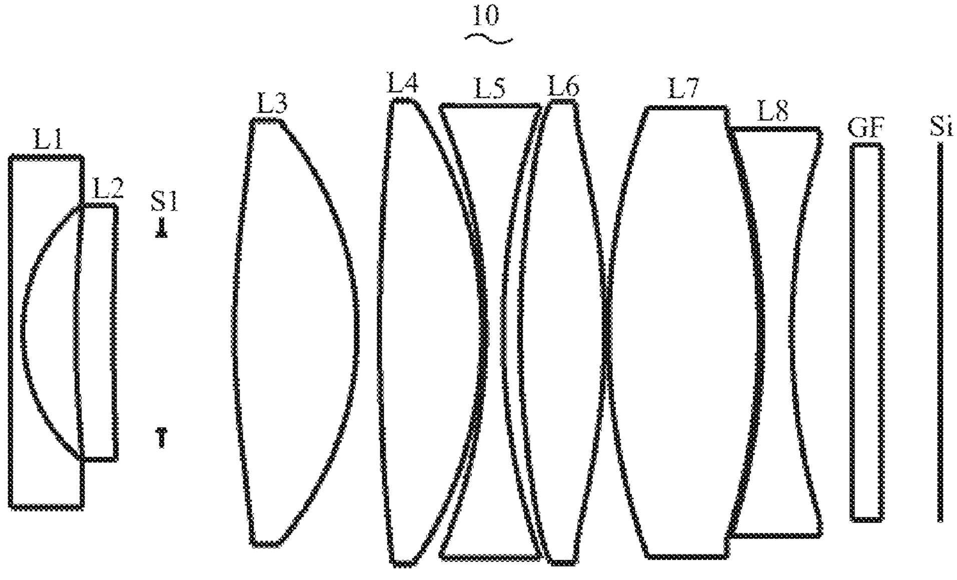
FIG. 1 is a schematic diagram of a camera optical lens in accordance with a first embodiment of the present disclosure.

To make the technical problems to be solved, technical solutions and beneficial effects of the present disclosure more apparent, the present disclosure is described in further detail together with the figure and the embodiments. It should be understood the specific embodiments described hereby is only to explain the present disclosure, not intended to limit the disclosure. It is understandable to a person having ordinary skill in the art that, in various embodiments of the disclosure, many technical details are proposed to enable the reader to better understand the present disclosure. However, even without the technical details and various variations and modifications based on the following embodiments, the technical solution claimed to be protected by the present disclosure can be realized.

In embodiments of the present disclosure, the terms "up," "down," "left," "right," "before," "after," "top," "bottom," "inside," "outside," "in," "vertical," "level," "horizontal," "vertical," and the like indicate location or position relations based on the location or position relations shown in the accompanying drawings. These terms are intended primarily to better describe the present disclosure and its embodiments. These terms are not intended to qualify that the indicated device, elements, or components must have a particular orientation, or be constructed and operated in a particular orientation.

Besides, some of the above terms may be used to indicate other meanings besides orientation or position relations. For example, the term "up," may also be used to indicate a certain attachment or connection relationship in some cases. To a person having ordinary skill in the art, the specific meaning of these terms in the present disclosure may be understood according to the specific circumstances.

In addition, the terms "install," "set up," "set up," "open," "connect," "connect," should be understood in a broad sense. For example, it may be a fixed connection, a removable connection, or a monolithic construction. It may be a mechanical connection or an electrical connection. It may be a direct connection, an indirect connection through an intermediate medium, or an internal connection between two devices, elements, or components. To a person having ordinary skill in the art, the specific meaning of the above terms in the present disclosure may be understood according to the specific circumstances.

It should be noted that in present disclosure, relational terms such as first and second are used only to distinguish one entity or operation from another and do not necessarily require or imply any such actual relationship or order between those entities or operations. Furthermore, the term "including," "containing," or any other variation thereof are intended to cover non-exclusive inclusion, such that a process, method, article, or apparatus comprising a set of elements includes not only those elements, but also other elements not expressly listed, or other elements as are inherent to such process, method, article or apparatus. Without further limitation, the fact that an element is defined by the phrase "including . . . " does not preclude the existence of additional identical elements in the process, method, article, or apparatus including the said element.

First Embodiment

Referring to FIG. 1, the first embodiment of the present disclosure provides a camera optical lens 10. From the object side to the image side, the camera optical lens 10 includes in sequence: a first lens L1, a second lens L2, a third lens L3, a fourth lens L4, a fifth lens L5, a sixth lens L6, a seventh lens L7, and an eighth lens L8. The thickness on-axis of the first lens L1 is defined as d1. The thickness on-axis of the second lens L2 is defined as d3. The curvature radius of the object side surface of the second lens L2 is defined as R3. The curvature radius of the image side surface of the second lens L2 is defined as R4. The focal length of the third lens L3 is defined as f3. The focal length of the fourth lens L4 is defined as f4. The focal length of the sixth lens L6 is defined as f6. The focal length of the seventh lens L7 is defined as f7. The refractive index of the eighth lens L8 is defined as nd8. And the following conditions should be satisfied:

$$1.00 \le d3/d1 \le 3.00 \tag{1}$$

$$0.20 \le R3/R4 \le 0.90 \tag{2}$$

$$1.00 \le f4/f3 \le 4.00 \tag{3}$$

$$0.50 \le f6/f7 \le 1.40 \tag{4}$$

$$1.80 \le nd8 \le 2.20 \tag{5}$$

In which, the formula (1) fixes the ratio of the thickness on-axis d3 of the second lens L2 to the thickness on-axis d1 of the first lens L1. When the ratio is within the range fixed in the formula (1), it is beneficial for the compression of the total optical length TTL of the camera optical lens 10, and it is beneficial for the realization of miniaturization.

The formula (2) fixes the shape of the second lens L2. When the formula (2) is satisfied, the degree of deflection of light passing through the second lens L2 can be eased, and the lateral color can be effectively corrected, so that the lateral color is less than or equal to 6.0 μm.

The formula (3) fixes the ratio of the focal length f4 of the fourth lens L4 to the focal length f3 of the third lens L3. When the ratio is within the range fixed in the formula (3), the appropriate distribution of the optical focal length of the camera optical lens 10 results in that the camera optical lens 10 has better imaging quality and lower sensitivity.

The formula (4) fixes the ratio of the focal length f6 of the sixth lens L6 to the focal length f7 of the seventh lens L7. It can be seen from the range limited by the formula (4) that the focal length f6 of the sixth lens L6 and the focal length f7 of the seventh lens L7 are relatively close to each other, which is beneficial for the light passing through the sixth lens L6 and the seventh lens L7 smoothly excessive, so that the image quality of the camera optical lens 10 can be improved.

The formula (5) fixes the refractive index of the eighth lens L8. It can be seen that the eighth lens L8 is made of a material with a higher refractive index, so that it is beneficial to reduce the aperture of the rear end of the camera optical lens 10 and improve the image quality of the camera optical lens 10.

In this embodiment, by setting a plurality of lenses (L1, L2, L3, L4, L5, L6, L7, L8), the ratio of the thickness of the second lens L2 to the thickness of the first lens L1, the shape of the second lens L2, the ratio of the focal length f3 of the third lens L3 to the focal length f4 of the fourth lens L4, the ratio of the focal length f6 of the sixth lens L6 to the focal length f7 of the seventh lens L7, and the refractive index of the eighth lens L8, so that the camera optical lens 10 has good optical performance, and the camera optical lens has characteristics of large aperture and miniaturization. The camera optical lens 10 is particularly suitable for cellular phone camera lens assemblies, WEB camera lenses and vehicle-mounted Lidar lens, which includes camera elements such as CCD and CMOS for high pixel.

Preferably, the focal length of the eighth lens L8 is defined as f8, the focal length of the camera optical lens 10 is defined as f, and the following condition should be satisfied:

$$|f8/f| \le 3.00 \tag{6}$$

The formula (6) fixes the focal length of the eighth lens L8. It can be seen that the focal length of the eighth lens L8 is short, which is beneficial for improving the light receiving ability of the camera optical lens 10, ensuring the luminous flux light flux and allowing for a smaller main ray angle (CRA, Chief Ray Angle), so that the relative illumination of the camera optical lens 10 is improved.

Preferably, the vision field angle of the camera optical lens 10 is defined as FOV (i.e., field of view), the focal length of the camera optical lens 10 is defined as f, the image height of the camera optical lens 10 is defined as IH. The following condition shall be satisfied:

$$(FOV*f)/IH \geq 95 \quad (7)$$

Within the range fixed in the formula (7), the camera optical lens 10 can be made to take into account both the field of view and long focus to realize medium and long-distance imaging.

Preferably, the camera optical lens 10 also may be satisfied with the following condition:

$$(FOV*f)/IH \leq 125 \quad (8)$$

In the embodiment, the first lens L1 has a concave object side surface at the proximal axis and a concave image side surface at the proximal axis. The first lens L1 has a negative refractive power. In other alternative embodiment, the first lens L1 may also have a positive refractive power, and the object side surface and the image side surface of the first lens L1 may also be provided with other concave and convex distributions.

Preferably, the curvature radius of the object side surface of the first lens L1 is defined as R1, the curvature radius of the image side surface of the first lens L1 is defined as R2, the focal length of the first lens L1 is defined as f1, the focal length of the camera optical lens 10 is defined as f, and the total optical length of the camera optical lens 10 is defined as TTL. The following conditions shall be satisfied:

$$0.44 \leq (R1+R2)/(R1-R2) \leq 5.87 \quad (9)$$

$$-7.27 \leq f1/f \leq -0.83 \quad (10)$$

$$0.01 \leq d1/TTL \leq 0.05 \quad (11)$$

The formula (9) fixes the shape of the first lens L1. When the formula (9) is satisfied, it is beneficial for improving the imaging quality of the camera optical lens 10. Preferably, the following condition shall be satisfied, $0.70 \leq (R1+R2)/(R1-R2) \leq 4.70$. The formula (10) fixes the ratio of the focal length f1 of the first lens L1 to the focal length f of the camera optical lens 10. When the formula (10) is satisfied, it is beneficial for improving the optical performance of the camera optical lens. The following condition shall be satisfied, $-4.55 \leq f1/f \leq -1.04$. The formula (11) fixes the ratio of the thickness on-axis d1 of the first lens L1 to the total optical length TTL of the camera optical lens 10. When the formula (11) is satisfied, it is conducive to the realization of ultra-thin design. The following condition shall be satisfied, $0.01 \leq d1/TTL \leq 0.04$.

In this embodiment, the second lens L2 has a convex object side surface at the proximal axis and a concave image side surface at the proximal axis. The second lens L2 has a positive refractive power. In other alternative embodiments, the object side surface and the image side surface of the second lens L2 may also be provided with other concave and convex distributions, and the second lens L2 may also have a negative refractive power.

Preferably, the focal length of the second lens L2 is defined as f2, the focal length of the camera optical lens 10 is defined as f, and the total optical length of the camera optical lens 10 is defined as TTL. The following conditions should be satisfied:

$$-34.47 \leq (R3+R4)/(R3-R4) \leq -1.01 \quad (12)$$

$$3.18 \leq f2/f \leq 17.23 \quad (13)$$

$$0.01 \leq d3/TTL \leq 0.08 \quad (14)$$

The formula (12) fixes the shape of the second lens L2. When the formula (12) is satisfied, it is beneficial for correcting the aberration of the image on-axis and the like of the camera optical lens 10. Preferably, the following condition shall be satisfied, $-21.54 \leq (R3+R4)/(R3-R4) \leq -1.26$. The formula (13) fixes the ratio of the focal length f2 of the second lens L2 to the focal length f of the camera optical lens 10. When the formula (13) is satisfied, the second lens L2 has the appropriate positive refractive power, which is conducive to the design of ultra-thin and wide-angle of the camera optical lens. The following condition shall be satisfied, $5.09 \leq f2/f \leq 13.78$. The formula (14) fixes the ratio of the thickness on-axis d3 of the second lens L2 to the total optical length TTL of the camera optical lens 10. When the formula (14) is satisfied, it is conducive to the realization of ultra-thin design. Preferably, the following condition shall be satisfied, $0.02 \leq d3/TTL \leq 0.07$.

In this embodiment, the third lens L3 has a convex object side surface at the proximal axis and a convex image side surface at the proximal axis. The third lens L3 has a positive refractive power. In other alternative embodiments, the object side surface and the image side surface of the third lens L3 may also be provided with other concave and convex distributions, and the third lens L3 may also have a negative refractive power.

Preferably, the curvature radius of the object side surface of the third lens L3 is defined as R5, the curvature radius of the image side surface of the third lens L3 is defined as R6, the focal length of the camera optical lens 10 is defined as f, the thickness on-axis of the third lens L3 is defined as d5, the total optical length of the camera optical lens 10 is defined as TTL. The following conditions should be satisfied:

$$0.01 \leq (R5+R6)/(R5-R6) \leq 0.62 \quad (15)$$

$$0.47 \leq f3/f \leq 2.47 \quad (16)$$

$$0.03 \leq d5/TTL \leq 0.22 \quad (17)$$

The formula (15) fixes the shape of the third lens L3. When the formula (15) is satisfied, it is beneficial for improving the imaging quality. Preferably, the following condition shall be satisfied, $0.02 \leq (R5+R6)/(R5-R6) \leq 0.49$. The formula (16) fixes the ratio of the focal length f3 of the third lens L3 to the focal length f of the camera optical lens 10, by which, the aberration can be reduced. Preferably, the following condition shall be satisfied, $0.75 \leq f3/f \leq 1.97$. The formula (17) fixes the ratio of the thickness on-axis d5 of the third lens L3 to the total optical length TTL of the camera optical lens 10. When the formula (17) is satisfied, it is beneficial to meet the design of ultra-thin of the camera optical lens 10. The following condition shall be satisfied, $0.05 \leq d5/TTL \leq 0.17$.

In this embodiment, the fourth lens LA has a convex object side surface at the proximal axis and a convex image side surface at the proximal axis. The fourth lens L4 has a positive refractive power. In other alternative embodiments, the object side surface and the image side surface of the fourth lens L4 may also be provided with other concave and convex distributions, and the fourth lens L4 can also have a negative refractive power.

Preferably, the curvature radius of the object side surface of the fourth lens L4 is defined as R7, the curvature radius of the image side surfaces of the fourth lens L4 is defined as R8, the focal length of the camera optical lens 10 is defined as f, the thickness on-axis of the fourth lens L4 is defined as d7, the total optical length of the camera optical lens 10 is defined as TTL. The following conditions should be satisfied:

$$-1.98 \leq (R7+R8)/(R7-R8) \leq 1.12 \quad (18)$$

$$0.76 \leq f4/f \leq 5.61 \quad (19)$$

$$0.01 \leq d7/TTL \leq 0.23 \quad (20)$$

The formula (18) fixes the shape of the fourth lens L4. When the formula (18) is satisfied, it is beneficial for correcting the aberration on-axis, with the development of ultra-thin and wide angle of the camera optical lens. Preferably, the following condition shall be satisfied, $-1.24 \leq (R7+R8)/(R7-R8) \leq 0.89$. The formula (19) fixes the ratio of the focal length f4 of the fourth lens L4 to the focal length f of the camera optical lens 10. When the formula (19) is satisfied, it is beneficial for reducing the aberration and improving the imaging quality. Preferably, the following condition shall be satisfied, $1.22 \leq f4/f \leq 4.49$. The formula (20) fixes the ratio of the thickness on-axis d7 of the fourth lens L4 to the total optical length TTL of the camera optical lens 10, by which, it is beneficial for realizing the ultra-thin design of the camera optical lens. Preferably, the following condition shall be satisfied, $0.01 \leq d7/TTL \leq 0.19$.

In this embodiment, the fifth lens L5 has a concave object side surface at the proximal axis and a concave image side surface at the proximal axis. The fifth lens L5 has a negative refractive power. In other alternative implementations, the object side surface and the image side surface of the fifth lens L5 may also be provided with other concave and convex distributions, and the fifth lens L5 may also have a positive refractive power.

Preferably, the curvature radius of the object side surface of the fifth lens L5 is defined as R9, the curvature radius of the image side surface of the fifth lens L5 is defined as R10, the focal length of the fifth lens L5 is defined as f5, the focal length of the camera optical lens 10 is defined as f, the thickness on-axis of the fifth lens L5 is defined as d9, and the total optical length of the camera optical lens 10 is defined as TTL. The following conditions should be satisfied:

$$-0.99 \leq (R9+R10)/(R9-R10) \leq 1.45 \quad (21)$$

$$-3.48 \leq f5/f \leq -0.45 \quad (22)$$

$$0.00 \leq d9/TTL \leq 0.28 \quad (23)$$

The formula (21) fixes the shape of the fifth lens L5, by which, it is beneficial for efficiently correcting the spherical aberration of the system. Preferably, the following condition shall be satisfied, $-0.62 \leq (R9+R10)/(R9-R10) \leq 1.16$. The formula (22) fixes the ratio of the focal length f5 of the fifth lens L5 to the focal length f of the camera optical lens 10, by which, it is beneficial to improve the optical performance of the camera optical lens. Preferably, the following condition shall be satisfied, $-2.17 \leq f5/f \leq -0.56$. The formula (23) fixes the ratio of the thickness on-axis d9 of the fifth lens L5 to the total optical length TTL of the camera optical lens 10. When the formula (23) is satisfied, it is beneficial for the compression of the total optical length TTL of the camera optical lens 10. Preferably, the following condition shall be satisfied, $0.01 \leq d9/TTL \leq 0.22$.

In this embodiment, the sixth lens L6 has a convex object side surface at the proximal axis and a convex image side surface at the proximal axis, and the sixth lens L6 has a positive refractive power. In other alternative embodiment, the sixth lens L6 may also have a negative refractive power, and the object side surface and the image side surface of the sixth lens L6 may also be provided with other concave and convex distributions.

Preferably, the curvature radius of the object side surface of the sixth lens L6 is defined as R11, the curvature radius of the image side surface of the sixth lens L6 is defined as R12, the focal length of the camera optical lens 10 is defined as f, the thickness on-axis of the sixth lens L6 is defined as d11, and the total optical length of the camera optical lens is defined as TTL. The following conditions should be satisfied:

$$-2.00 \leq (R11+R12)/(R11-R12) \leq 0.22 \quad (24)$$

$$1.00 \leq f6/f \leq 5.66 \quad (25)$$

$$0.01 \leq d11/TTL \leq 0.14 \quad (26)$$

The formula (24) fixes the shape of the sixth lens L6, by which, the deflection degree of light passing through the lens can be eased, and the aberration can be effectively reduced. Preferably, the following condition shall be satisfied, $-1.25 \leq (R11+R12)/(R11-R12) \leq 0.17$. The formula (25) fixes the ratio of the focal length f6 of the sixth lens L6 to the focal length f of the camera optical lens 10, by which, it is beneficial for reducing the aberration and improving the imaging quality. Preferably, the following condition shall be satisfied, $1.61 \leq f6/f \leq 4.53$. The formula (26) fixes the ratio of the thickness on-axis d11 of the sixth lens L6 to the total optical length TTL of the camera optical lens 10, which is beneficial for compressing the total optical length TTL of the camera optical lens 10 and realizing the ultra-thin design of the camera optical lens 10. Preferably, the following condition shall be satisfied, $0.02 \leq d11/TTL \leq 0.11$.

In this embodiment, the seventh lens L7 has a convex object side surface at the proximal axis position and a convex image side surface at the proximal axis. The seventh lens L7 has a positive refractive power. In other alternative embodiment, the seventh lens L7 may also have a negative refractive power, the object side surface and the image side surface of the seventh lens L7 may also be provided with other concave and convex distributions.

Preferably, the curvature radius of the object side surface of the seventh lens L7 is defined as R13, the curvature radius of the image side surface of the seventh lens L7 is defined as R14, the focal length of the camera optical lens 10 is defined as f, the thickness on-axis of the seventh lens L7 is defined as d13, and the total optical length of the camera optical lens 10 is defined as TTL. The following conditions should be satisfied:

$$-11.16 \leq (R13+R14)/(R13-R14) \leq -0.01 \quad (27)$$

$$0.89 \leq f7/f \leq 10.88 \quad (28)$$

$$0.01 \leq d13/TTL \leq 0.30 \quad (29)$$

The formula (27) fixes the shape of the seventh lens L7, by which, it is beneficial for reducing the degree of deflection of light passing through the seventh lens L7 and reducing the aberration effectively. Preferably, the following condition shall be satisfied, $-6.98 \leq (R13+R14)/(R13-R14) \leq -0.01$. The formula (28) fixes the ratio of the focal length f7 of the seventh lens L7 to the focal length f of the camera optical lens 10, by which, it is beneficial for improving the optical performance of the camera optical lens 10. Preferably, the following condition shall be satisfied, $1.43 \leq f7/f \leq 8.71$. The formula (29) fixes the ratio of the thickness on-axis d13 of the seven lens L7 to the total optical length TTL of the camera optical lens 10. When the formula (29) is satisfied, it is beneficial for realizing the design of ultra-thin of the camera optical lens 10. Preferably, the following condition shall be satisfied, $0.02 \leq d13/TTL \leq 0.24$.

In this embodiment, the eighth lens L8 has a concave object side surface at the axis position and a concave image side surface at the axis position. The eighth lens L8 has a negative refractive power. In other alternative embodiments, the eighth lens L8 may also have a positive refractive power, and the object side surface and the image side surface of the eighth lens L8 may also be provided with other concave and convex distributions.

Preferably, the curvature radius of the object side surface of the eighth lens L8 is defined as R15, the curvature radius of the image side surface of the eighth lens L8 is defined as R16, the thickness on-axis of the eighth lens L8 is defined as d15, and the total optical length of the camera optical lens is defined as TTL. The following conditions should be satisfied:

$$-12.5 \leq (R15+R16)/(R15-R16) \leq 0.02 \quad (30)$$

$$0.01 \leq d15/TTL \leq 0.05 \quad (31)$$

The formula (30) fixes the shape of the eighth lens L8, by which, it is beneficial for correcting the aberration of the image on-axis, with the design of ultra-thin and wide angle. Preferably, the following condition shall be satisfied, $-7.81 \leq (R15+R16)/(R15-R16) \leq 0.01$. The formula (31) fixes the ratio of the thickness on-axis d15 of the eight lens L8 to the total optical length TTL of the camera optical lens 10, which is beneficial for control the total optical length TTL of the camera optical lens 10 reasonably. Preferably, the following condition shall be satisfied, $0.01 \leq d15/TTL \leq 0.04$.

Preferably, the F number FNO of the camera optical lens 10 satisfies the following condition:

$$FNO \leq 1.65 \quad (32)$$

The formula (32) fixes the F number of aperture of the camera optical lens 10. When the formula (32) is satisfied, it is beneficial for the realization of miniaturization, and a larger amount of incoming light can be achieved.

In this embodiment, the first lens L1, the second lens L2, the third lens L3, the fourth lens L4, the fifth lens L5, the sixth lens L6, the seventh lens L7 and the eighth lens L8 may all be made of glass material. In other alternative embodiments, each lens may also be made of other materials.

Preferably, the first lens L1 is a spherical lens, the second lens L2 is a spherical lens, the third lens L3 is an aspheric lens, the fourth lens L4 is a spherical lens, the fifth lens L5 is a spherical lens, the sixth lens L6 is an aspheric lens, the seventh lens L7 is a spherical lens, and the eighth lens L8 is a spherical lens.

In this embodiment, optical elements like an optical filter GF may be arranged between the eighth lens L8 and the image surface Si. The optical filter GF may be a glass cover plate or an optical filter sheet (filter). As shown in FIG. 1, an optical filter sheet GF is arranged between the eighth lens L8 and the image surface Si. In other embodiments, the optical filter GF can also be arranged at other positions.

The camera optical lens 10 of the present disclosure has good optical performance and can meet the design requirements of a large aperture and minimization. The camera optical lens 10 is particularly suitable for cellular phone camera lens assemblies, WEB camera lenses and vehicle-mounted Lidar lens, which includes camera elements such as CCD and CMOS for high pixel.

The camera optical lens 10 of the present disclosure will be described below by way of examples. The various symbols recorded in each example are shown in table 1. The unit of the focal length, distance on-axis, curvature radius, thickness on-axis, location of inflection point, and location of stationary point is mm.

TTL: Total optical length (the distance on-axis from the object side surface of the first lens L1 to the image Si), and the unit of TTL is mm.

Preferably, the camera optical lens 10 may also be provided with one or both of at least an inflection point and at least a stationary point on one or both of the object side surface and the image side surface, which is beneficial for meeting the requirements of high imaging quality. The specific embodiments are described below.

FIG. 1 is a schematic diagram of a camera optical lens in accordance with a first embodiment of the present disclosure. The design data of the camera optical lens 10 in the first embodiment of the present disclosure are described below.

Table 1 shows the curvature radius R, the thickness on-axis of the lens, the distance on-axis d between the lenses, the refractive index nd, and the Abbe number vd of the object side surface as well as the image side surface of the first lens L1 to the eighth lens L8 constituting the camera optical lens 10 in the first embodiment of the present disclosure. table 2 shows the conic coefficients k and the aspheric coefficients of the camera optic 10 as described. It is to be noted that in this embodiment, the unit of distance, radius and thickness is millimeter (mm).

TABLE 1

| | R | d | | | nd | | vd |
|---|---|---|---|---|---|---|---|
| S1 | ∞ | d0= | −4.690 | | | | |
| R1 | −1953.929 | d1= | 0.388 | nd1 | 1.5891 | vd1 | 61.25 |
| R2 | 4.385 | d2= | 1.653 | | | | |
| R3 | 29.476 | d3= | 1.162 | nd2 | 1.7552 | vd2 | 27.55 |
| R4 | 72.748 | d4= | 3.768 | | | | |
| R5 | 19.469 | d5= | 3.809 | nd3 | 1.6192 | vd3 | 63.85 |
| R6 | −8.143 | d6= | 0.703 | | | | |
| R7 | 51.936 | d7= | 3.189 | nd4 | 1.4970 | vd4 | 81.59 |
| R8 | −10.890 | d8= | 0.107 | | | | |
| R9 | −14.525 | d9= | 0.542 | nd5 | 1.7618 | vd5 | 26.61 |
| R10 | 17.706 | d10= | 0.541 | | | | |
| R11 | 23.167 | d11= | 2.627 | nd6 | 1.8513 | vd6 | 40.10 |
| R12 | −17.279 | d12= | 0.116 | | | | |
| R13 | 16.818 | d13= | 4.680 | nd7 | 1.7340 | vd7 | 51.49 |
| R14 | −17.208 | d14= | 0.108 | | | | |
| R15 | −16.743 | d15= | 0.915 | nd8 | 1.8467 | vd8 | 23.79 |
| R16 | 16.359 | d16= | 1.873 | | | | |
| R17 | ∞ | d17= | 0.900 | ndg | 1.5168 | vgd | 64.21 |
| R18 | ∞ | d18= | 1.845 | | | | |

In which, the meaning of the various symbols is as follows.

R: The curvature radius of the optical surface, the central curvature radius in case of lens;

S1: Aperture;

R1: The curvature radius of the object side surface of the first lens L1;

R2: The curvature radius of the image side surface of the first lens L1;

R3: The curvature radius of the object side surface of the second lens L2;

R4: The curvature radius of the image side surface of the second lens L2;

R5: The curvature radius of the object side surface of the third lens L3;

R6: The curvature radius of the image side surface of the third lens L3;

R7: The curvature radius of the object side surface of the fourth lens L4;

R8: The curvature radius of the image side surface of the fourth lens L4;

R9: The curvature radius of the object side surface of the fifth lens L5;

R10: The curvature radius of the image side surface of the fifth lens L5;

R11: The curvature radius of the object side surface of the sixth lens L6;

R12: The curvature radius of the image side surface of the sixth lens L6;

R13: The curvature radius of the object side surface of the seventh lens L7;

R14: The curvature radius of the image side surface of the seventh lens L7;

R15: The curvature radius of the object side surface of the eight lens L8;

R16: The curvature radius of the image side surface of the eight lens L8;

R17: The curvature radius of the object side surface of the optical filter GF;

R18: The curvature radius of the image side surface of the optical filter GF;

d: The thickness on-axis of the lens, or the distance on-axis between the lenses;

d0: The distance on-axis from the aperture S1 to the object side surface of the first lens L1;

d1: The thickness on-axis of the first lens L1;

d2: The distance on-axis from the image side surface of the first lens L1 to the object side surface of the second lens L2;

d3: The thickness on-axis of the second lens L2;

d4: The distance on-axis from the image side surface of the second lens L2 and the object side surface of the third lens L3;

d5: The thickness on-axis of the third lens L3;

d6: The distance on-axis from the image side surface of the third lens L3 to the object side surface of the fourth lens L4;

d7: The thickness on-axis of f the fourth lens L4;

d8: The distance on-axis from the image side surface of the fourth lens L4 to the object side surface of the fifth lens L5;

d9: The thickness on-axis of the fifth lens L5;

d10: The distance on-axis from the image side surface of the fifth lens L5 to the object side surface of the sixth lens L6;

d11: The thickness on-axis of the sixth lens L6;

d12: The distance on-axis from the image side surface of the sixth lens L6 to the object side surface of the seventh lens L7;

d13: The thickness on-axis of the seventh lens L7;

d14: The distance on-axis from the image side surface of the seventh lens L7 to the object side surface of the eight lens L8;

d15: The thickness on-axis of the eight lens L8;

d16: The distance on-axis from the image side surface of the eight lens L8 and the object side surface of the optical filter GF;

d17: The thickness on-axis of the optical filter GF;

d18: The distance on-axis from the image side surface of the optical filter GF and the image surface Si;

nd: The refractive power of d line (d line is green light with a wavelength of 550 nm);

nd1: The refractive power of the d line of the first lens L1;

nd2: The refractive power of the d line of the second lens L2;

nd3: The refractive power of the d line of the third lens L3;

nd4: The refractive power of the d line of the fourth lens L4;

nd5: The refractive power of the d line of the fifth lens L5;

nd6: The refractive power of the d line of the sixth lens L6;

nd7: The refractive power of the d line of the seventh lens L7;

nd8: The refractive power of the d line of the eight lens L8;

ndg: The refractive power of d line of the optical filter GF;

vd: The abbe number;

vd1: The abbe number of the first lens L1;

vd 2: The abbe number of the second lens L2;

vd 3: The abbe number of the third lens L3;

vd 4: The abbe number of the fourth lens L4;

vd 5: The abbe number of the fifth lens L5;

vd 6: The abbe number of the sixth lens L6;

vd 7: The abbe number of the seventh lens L7;

vd 8: The abbe number of the eight lens L8;

vg: The abbe number of the optical filter GF.

TABLE 2

| | conic coefficients | aspheric coefficients | | | | |
|---|---|---|---|---|---|---|
| | k | A4 | A6 | A8 | A10 | A12 |
| R1 | / | / | / | / | / | / |
| R2 | / | / | / | / | / | / |
| R3 | / | / | / | / | / | / |
| R4 | / | / | / | / | / | / |
| R5 | 9.8980E+00 | −5.2643E−04 | −3.7881E−06 | 7.3542E−07 | −6.3346E−08 | 2.2864E−09 |
| R6 | 8.3998E−02 | 4.4298E−05 | −3.8295E−06 | 6.1342E−07 | −2.8578E−08 | 7.2265E−10 |
| R7 | / | / | / | / | / | / |
| R8 | / | / | / | / | / | / |
| R9 | / | / | / | / | / | / |
| R10 | / | / | / | / | / | / |
| R11 | 9.2567E+00 | −2.1889E−04 | 2.2568E−06 | −1.8671E−07 | 5.6985E−09 | −4.3425E−11 |
| R12 | −4.5949E+00 | −2.2050E−05 | −7.6684E−07 | 8.5361E−08 | −2.6389E−09 | 6.6962E−11 |
| R13 | / | / | / | / | / | / |
| R14 | / | / | / | / | / | / |
| R15 | / | / | / | / | / | / |
| R16 | | / | / | / | / | / |

| | conic coefficients | aspheric coefficients | | | | |
|---|---|---|---|---|---|---|
| | k | A14 | A16 | A18 | A20 | / |
| R1 | / | / | / | / | / | / |
| R2 | / | / | / | / | / | / |
| R3 | / | / | / | / | / | / |
| R4 | / | / | / | / | / | / |
| R5 | 9.8980E+00 | −3.4393E−11 | 2.1856E−15 | 1.1945E−16 | 2.8708E−18 | / |
| R6 | 8.3998E−02 | −6.4129E−12 | −4.6093E−15 | −1.9368E−16 | −6.7051E−18 | / |
| R7 | / | / | / | / | / | / |
| R8 | / | / | / | / | / | / |
| R9 | / | / | / | / | / | / |
| R10 | / | / | / | / | / | / |
| R11 | 9.2567E+00 | 6.4076E−15 | 2.5096E−16 | 2.6253E−18 | −1.3454E−19 | / |
| R12 | −4.5949E+00 | 1.4775E−14 | 6.9632E−17 | −2.4894E−18 | −3.3290E−20 | / |
| R13 | / | / | / | / | / | / |
| R14 | / | / | / | / | / | / |
| R15 | / | / | / | / | / | / |
| R16 | / | / | / | / | / | / |

For convenience, the aspheric of each lens is used the aspherical surfaces shown in formula (33) below. However, the present disclosure is not limited to the aspheric polynomial form represented by the formula (33).

$$z=(c^2/r)/\{1+[1-(k+1)(c^2/r^2)]^{1/2}\}+A4c^4+A6c^6+A8c^8+A10c^{10}+A12c^{12}+A14c^{14}+A16c^{16}+A18c^{18}+A20c^{20} \tag{33}$$

Where k is the cone coefficient, A4, A6, A8, A10, A12, A14, A16, A18 and A20 are aspheric coefficients, c is the curvature at the center of the optical surface, r is the vertical distance between the point on the aspheric curve and the optical axis, and z is the aspherical depth (i.e., the vertical distance between a point on the aspherical surface r from the optical axis and a section tangent to the vertex on the aspherical optical axis).

Table 3 and Table 4 respectively show the design data of the inflection point and stationary point of each lens of the camera optical lens 10 in the first embodiment of the present disclosure. Where P1R1 and P1R2 respectively represent the object side surface and the image side surface of the first lens L1, P2R1 and P2R2 respectively represent the object side surface and the image side surface of the second lens L2, P3R1 and P3R2 respectively represent the object side surface and the image side surface of the third lens L3, P4R1 and P4R2 respectively represent the object side surface and the image side surface of the fourth lens L4, P5R1 and P5R2 respectively represent the object side surface and the image side surface of the fifth lens L5, P6R1 and P6R2 respectively represent the object side surface and the image side surface of the sixth lens L6, P7R1 and P7R2 respectively represent the object side surface and the image side surface of the seventh lens L7, and P8R1 and P8R2 respectively represent the object side surface and the image side surface of the eighth lens L8. The data corresponding to the field of "location of inflection point" is the vertical distance between the inflection point set on the surface of each lens and the optical axis of the camera optical lens 10. The data corresponding to the field of "location of stationary point" is the vertical distance from the stationary point set on the surface of each lens to the optical axis of the camera optical lens 10.

TABLE 3

| | The number of inflection points | the location 1 of inflection point | the location 2 of inflection point |
|---|---|---|---|
| P1R1 | / | / | / |
| P1R2 | / | / | / |
| P2R1 | / | / | / |
| P2R2 | / | / | / |
| P3R1 | 2 | 4.405 | 5.445 |
| P3R2 | / | / | / |
| P4R1 | / | / | / |
| P4R2 | / | / | / |
| P5R1 | / | / | / |
| P5R2 | / | / | / |
| P6R1 | / | / | / |
| P6R2 | 1 | 4.915 | / |

TABLE 3-continued

| | The number of inflection points | the location 1 of inflection point | the location 2 of inflection point |
|---|---|---|---|
| P7R1 | / | / | / |
| P7R2 | / | / | / |
| P8R1 | / | / | / |
| P8R2 | / | / | / |

TABLE 4

| | the number of stationary points | the location of stationary point |
|---|---|---|
| P1R1 | / | / |
| P1R2 | / | / |
| P2R1 | / | / |
| P2R2 | / | / |
| P3R1 | / | / |
| P3R2 | / | / |
| P4R1 | / | / |
| P4R2 | / | / |
| P5R1 | / | / |
| P5R1 | / | / |
| P6R2 | 1 | 6.315 |
| P6R1 | / | / |
| P7R1 | / | / |
| P7R2 | / | / |
| P8R1 | / | / |
| P8R2 | / | / |

Table 21, which appears later, shows the various values in the first embodiment, and the values corresponding with the parameters which are already fixed in the conditions.

Figures 2, 3:
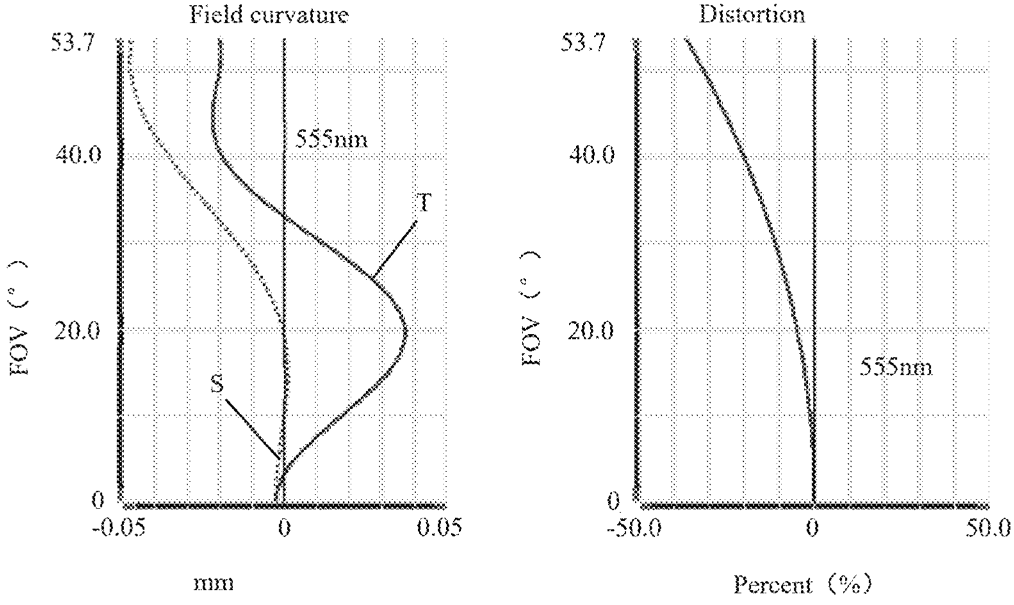
FIG. 2 presents a schematic diagram of the field curvature and distortion of the camera optical lens shown in FIG. 1.
FIG. 3 shows the lateral color of the camera optical lens shown in FIG. 1.
Figure 4:
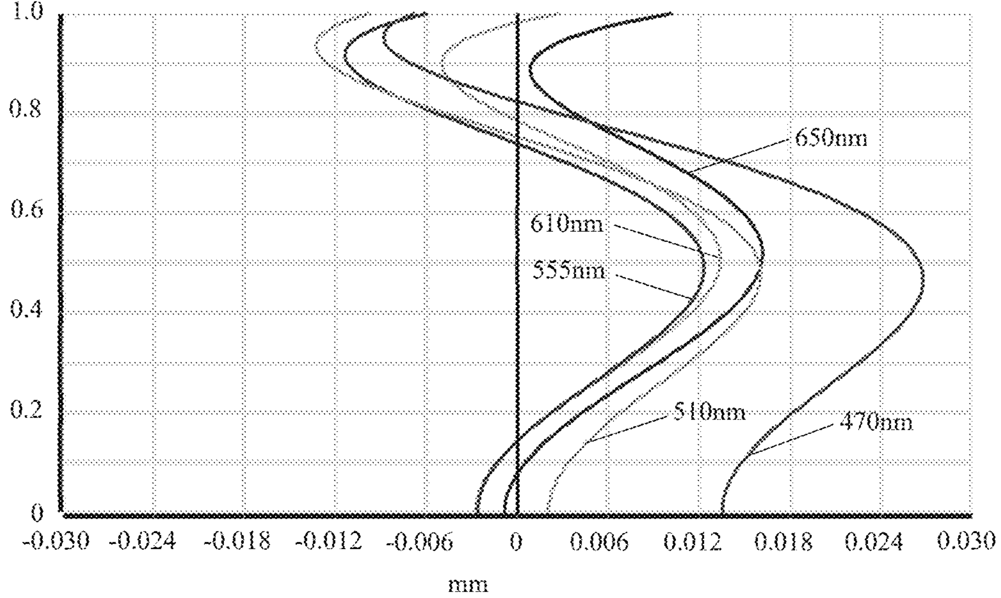
FIG. 4 shows the longitudinal aberration of the camera optical lens shown in FIG. 1.

FIG. 2 shows the schematic diagram of the field curvature and distortion after light with a wavelength of 555 nm passes through the camera optical lens 10 in the first embodiment. FIG. 3 shows the lateral color schematic diagram after light with wavelengths of 470 nm, 510 nm, 555 nm, 610 nm and 650 nm passes through the camera optical lens 10 in the first embodiment. FIG. 4 shows the longitudinal aberration after light with wavelengths of 470 nm, 510 nm, 555 nm, 610 nm and 650 nm passes through the camera optical lens 10 in the first embodiment.

As shown in Table 21, the first embodiment satisfies the various conditions.

In this embodiment, the pupil entering diameter (ENPD) of the camera optical lens 10 is 3.613 mm, the full vision field image height (IH) is 5.139 mm, and the vision field angle (FOV) in the diagonal direction is 107.40°. The camera optical lens 10 can meet the design requirements of large aperture and miniaturization, and chromatic aberrations on-axis and chromatic aberrations off-axis are adequately corrected. And the camera optical lens 10 has excellent optical characteristics.

Second Embodiment

Figure 5:
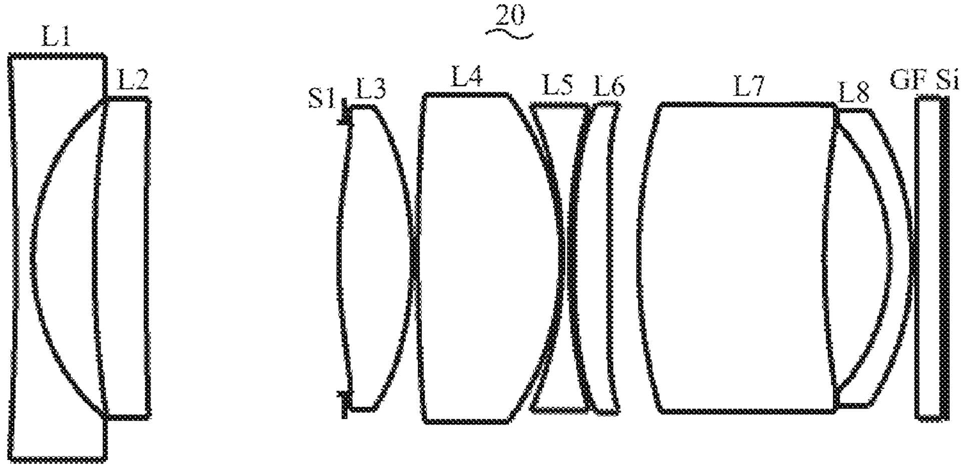
FIG. 5 is a schematic diagram of a camera optical lens in accordance with a second embodiment of the present disclosure.

FIG. 5 shows the camera optical lens 20 in the second embodiment of the present disclosure. The second embodiment is basically the same as the first embodiment, the meaning of its symbols is the same as that of the first embodiment, in the following, only the differences are described.

In the embodiment, the seventh lens L7 has a concave image side surface at the proximal axis, and the eighth lens L8 has a convex image side surface at the proximal axis.

Table 5 and table 6 show the design data of the camera optical lens 20 in the second embodiment of the present disclosure.

TABLE 5

| | R | | d | | nd | | vd |
|---|---|---|---|---|---|---|---|
| S1 | ∞ | d0= | −12.022 | | | | |
| R1 | −94.999 | d1= | 0.631 | nd1 | 1.5891 | vd1 | 61.25 |
| R2 | 6.523 | d2= | 2.240 | | | | |
| R3 | 29.728 | d3= | 1.890 | nd2 | 1.7552 | vd2 | 27.55 |
| R4 | 145.061 | d4= | 7.056 | | | | |
| R5 | 15.372 | d5= | 2.675 | nd3 | 1.6192 | vd3 | 63.85 |
| R6 | −10.519 | d6= | 0.200 | | | | |
| R7 | 57.054 | d7= | 5.252 | nd4 | 1.4970 | vd4 | 81.59 |
| R8 | −8.393 | d8= | 0.050 | | | | |
| R9 | −11.409 | d9= | 0.250 | nd5 | 1.7618 | vd5 | 26.61 |
| R10 | 18.613 | d10= | 0.165 | | | | |
| R11 | 35.218 | d11= | 1.315 | nd6 | 1.8513 | vd6 | 40.10 |
| R12 | −60.657 | d12= | 1.050 | | | | |
| R13 | 16.289 | d13= | 6.796 | nd7 | 1.7340 | vd7 | 51.49 |
| R14 | 23.402 | d14= | 2.386 | | | | |
| R15 | −6.045 | d15= | 0.810 | nd8 | 1.8467 | vd8 | 23.79 |
| R16 | −8.347 | d16= | 0.200 | | | | |
| R17 | ∞ | d17= | 0.900 | ndg | 1.5168 | vgd | 64.21 |
| R18 | ∞ | d18= | 0.200 | | | | |

TABLE 6

| | conic coefficients | aspheric coefficients | | | | |
|---|---|---|---|---|---|---|
| | k | A4 | A6 | A8 | A10 | A12 |
| R1 | / | / | / | / | / | / |
| R2 | / | / | / | / | / | / |
| R3 | / | / | / | / | / | / |
| R4 | / | / | / | / | / | / |
| R5 | 8.1312E+00 | −5.7574E−04 | −2.1811E−05 | 6.0811E−07 | −6.8337E−08 | 1.9317E−09 |
| R6 | 1.8290E−01 | 1.0531E−04 | −1.1082E−05 | 2.9700E−07 | −2.7739E−08 | 8.6712E−10 |
| R7 | / | / | / | / | / | / |
| R8 | / | / | / | / | / | / |
| R9 | / | / | / | / | / | / |
| R10 | / | / | / | / | / | / |
| R11 | 3.4105E+01 | 5.6290E−04 | −3.9872E−06 | −2.4854E−07 | 1.4357E−08 | 1.8238E−10 |
| R12 | −9.0058E+01 | 7.1455E−04 | −2.9737E−06 | 1.3028E−07 | 4.2945E−09 | 1.1381E−10 |
| R13 | / | / | / | / | / | / |
| R14 | / | / | / | / | / | / |
| R15 | / | / | / | / | / | / |
| R16 | | / | / | / | / | / |

TABLE 6-continued

| | conic coefficients | aspheric coefficients | | | | |
|---|---|---|---|---|---|---|
| | k | A14 | A16 | A18 | A20 | / |
| R1 | / | / | / | / | / | / |
| R2 | / | / | / | / | / | / |
| R3 | / | / | / | / | / | / |
| R4 | / | / | / | / | / | / |
| R5 | 8.1312E+00 | −4.2359E−11 | 2.4349E−13 | 1.3872E−14 | −1.9386E−15 | / |
| R6 | 1.8290E−01 | −7.8225E−12 | −3.3555E−13 | −1.1628E−14 | 3.3478E−16 | / |
| R7 | / | / | / | / | / | / |
| R8 | / | / | / | / | / | / |
| R9 | / | / | / | / | / | / |
| R10 | / | / | / | / | / | / |
| R11 | 3.4105E+01 | −4.5014E−12 | −3.8498E−13 | −6.2337E−15 | 5.7074E−16 | / |
| R12 | −9.0058E+01 | −5.0029E−12 | −2.0664E−13 | −1.6728E−16 | 4.7221E−16 | / |
| R13 | / | / | / | / | / | / |
| R14 | / | / | / | / | / | / |
| R15 | / | / | / | / | / | / |
| R16 | / | / | / | / | / | / |

Table 7 and Table 8 respectively show the design data of the inflection point and stationary point of each lens of the camera optical lens 20 in the second embodiment of the present disclosure.

TABLE 7

| | The number of inflection points | the location 1 of inflection point |
|---|---|---|
| P1R1 | / | / |
| P1R2 | / | / |
| P2R1 | / | / |
| P2R2 | / | / |
| P3R1 | 1 | 3.055 |
| P3R2 | / | / |
| P4R1 | / | / |
| P4R2 | / | / |
| P5R1 | / | / |
| P5R2 | / | / |
| P6R1 | / | / |
| P6R2 | 1 | 1.355 |
| P7R1 | / | / |
| P7R2 | / | / |
| P8R1 | / | / |
| P8R2 | / | / |

TABLE 8

| | the number of stationary points | the location of stationary point |
|---|---|---|
| P1R1 | / | / |
| P1R2 | / | / |
| P2R1 | / | / |
| P2R2 | / | / |
| P3R1 | 1 | 4.415 |
| P3R2 | / | / |
| P4R1 | / | / |
| P4R2 | / | / |
| P5R1 | / | / |
| P5R1 | / | / |
| P6R2 | 1 | 2.355 |
| P6R1 | / | / |
| P7R1 | / | / |
| P7R2 | / | / |
| P8R1 | / | / |
| P8R2 | / | / |

Table 21, which appears later, shows the various values in the second embodiment, and the values corresponding with the parameters which are already fixed in the conditions.

Figure 6:
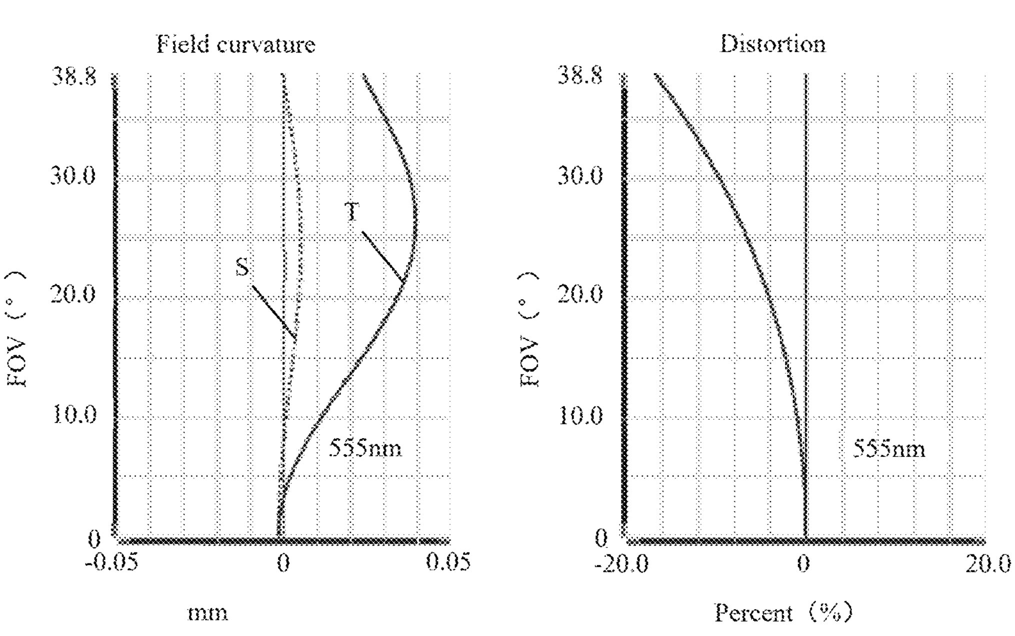
FIG. 6 presents a schematic diagram of the field curvature and distortion of the camera optical lens shown in FIG. 5.
Figure 7:
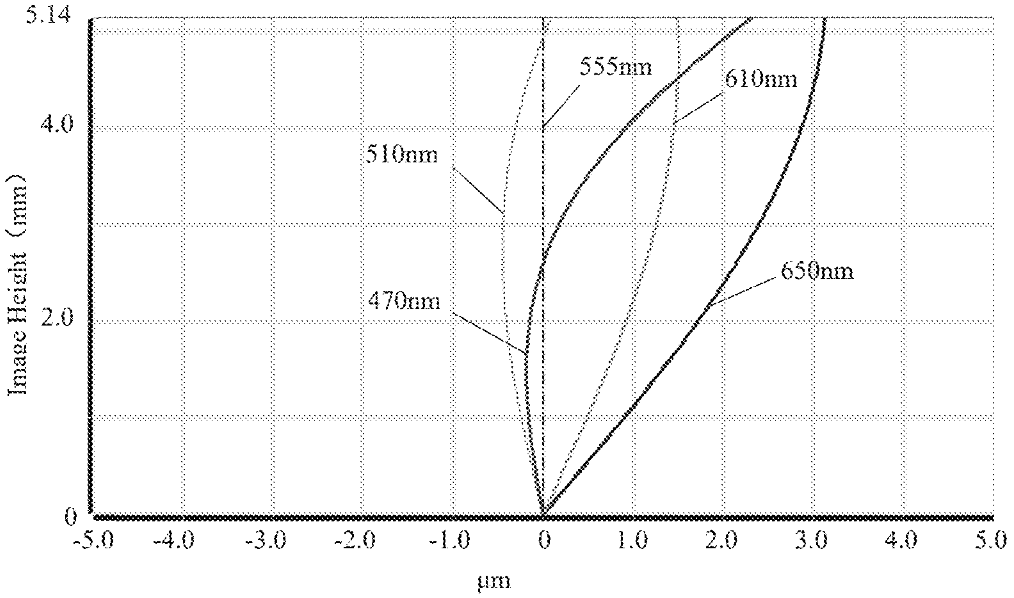
FIG. 7 shows the lateral color of the camera optical lens shown in in FIG. 5.
Figure 8:
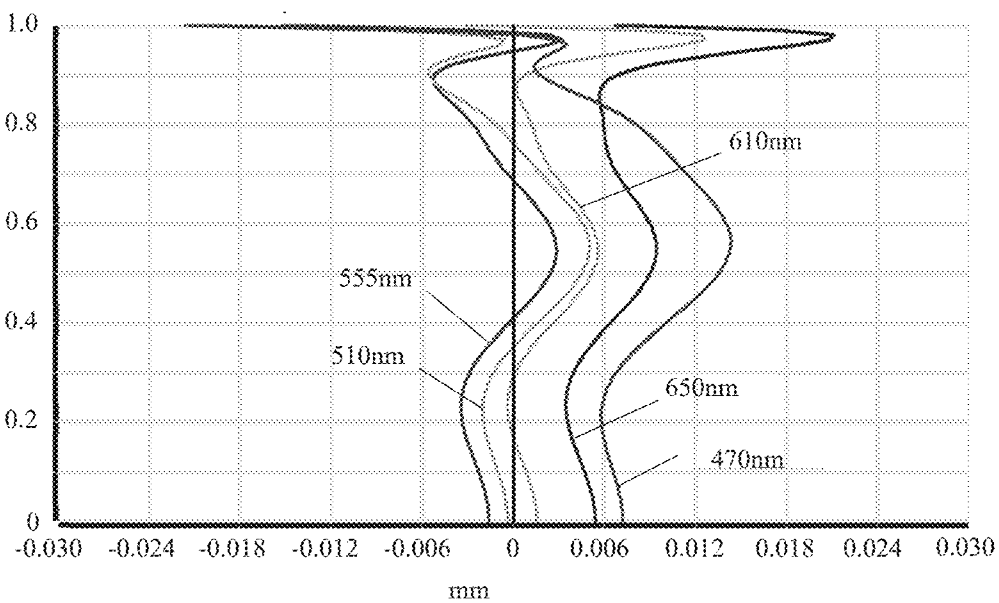
FIG. 8 shows the longitudinal aberration of the camera optical lens shown in FIG. 5.

FIG. 6 shows the schematic diagram of the field curvature and distortion after light with a wavelength of 555 nm passes through the camera optical lens 20 in the second embodiment. FIG. 7 shows the lateral color schematic diagram after light with wavelengths of 470 nm, 510 nm, 555 nm, 610 nm and 650 nm passes through the camera optical lens 20 in the second embodiment. FIG. 8 shows the longitudinal aberration after light with wavelengths of 470 nm, 510 nm, 555 nm, 610 nm and 650 nm passes through the camera optical lens 20 in the second embodiment.

As shown in Table 21, the second embodiment satisfies the various conditions.

In this embodiment, the pupil entering diameter (ENPD) of the camera optical lens 20 is 4.675 mm, the full vision field image height (IH) is 5.139 mm, and the vision field angle (FOV) in the diagonal direction is 77.60°. The camera optical lens 20 can meet the design requirements of large aperture and miniaturization, and chromatic aberrations on-axis and chromatic aberrations off-axis are adequately corrected. And the camera optical lens 20 has excellent optical characteristics.

Third Embodiment

Figure 9:
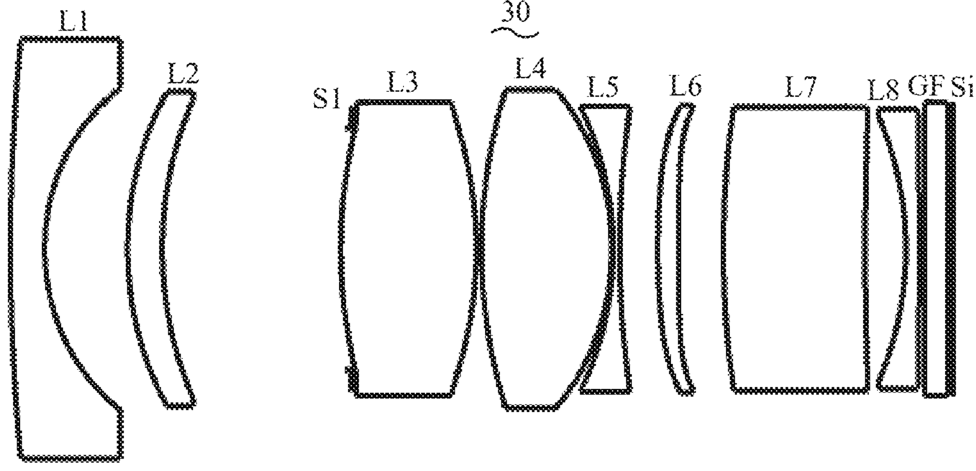
FIG. 9 is a schematic diagram of a camera optical lens in accordance with a third embodiment of the present disclosure.

FIG. 9 shows the camera optical lens 30 in the third embodiment of the present disclosure. The third embodiment is basically the same as the first embodiment, the meaning of its symbols is the same as that of the first embodiment, in the following, only the differences are described.

In this embodiment, the first lens of L1 has a convex object side surface at the proximal axis. The sixth lens L6 has a concave image side surface at the proximal axis. The seventh lens L7 has a concave image side surface at the proximal axis. The eighth lens L8 has a convex image side surface at the proximal axis.

Table 9 and table 10 show the design data of the camera optical lens 30 in the third embodiment of the present disclosure.

TABLE 9

| | R | | d | | nd | | vd |
|---|---|---|---|---|---|---|---|
| S1 | ∞ | d0= | −12.898 | | | | |
| R1 | 66.981 | d1= | 1.300 | nd1 | 1.5891 | vd1 | 61.25 |
| R2 | 6.970 | d2= | 3.140 | | | | |
| R3 | 10.852 | d3= | 1.315 | nd2 | 1.7552 | vd2 | 27.55 |
| R4 | 12.189 | d4= | 6.754 | | | | |

TABLE 9-continued

| | R | | d | | nd | | vd |
|---|---|---|---|---|---|---|---|
| R5 | 14.845 | d5= | 5.141 | nd3 | 1.6192 | vd3 | 63.85 |
| R6 | −13.070 | d6= | 0.200 | | | | |
| R7 | 17.410 | d7= | 4.928 | nd4 | 1.4970 | vd4 | 81.59 |
| R8 | −8.378 | d8= | 0.050 | | | | |
| R9 | −10.583 | d9= | 0.250 | nd5 | 1.7618 | vd5 | 26.61 |
| R10 | 31.535 | d10= | 1.441 | | | | |
| R11 | 25.660 | d11= | 0.800 | nd6 | 1.8513 | vd6 | 40.10 |
| R12 | 68311.732 | d12= | 1.686 | | | | |
| R13 | 31.282 | d13= | 5.372 | nd7 | 1.7340 | vd7 | 51.49 |
| R14 | 109.687 | d14= | 1.541 | | | | |
| R15 | −10.854 | d15= | 0.500 | nd8 | 1.8052 | vd8 | 25.48 |
| R16 | −281.556 | d16= | 0.199 | | | | |
| R17 | ∞ | d17= | 0.900 | ndg | 1.5168 | vgd | 64.21 |
| R18 | ∞ | d18= | 0.199 | | | | |

TABLE 11-continued

| | The number of inflection points | the location 1 of inflection point |
|---|---|---|
| P2R2 | / | / |
| P3R1 | / | / |
| P3R2 | 1 | 4.435 |
| P4R1 | / | / |
| P4R2 | / | / |
| P5R1 | / | / |
| P5R2 | / | / |
| P6R1 | / | / |
| P6R2 | / | / |
| P7R1 | / | / |
| P7R2 | / | / |
| P8R1 | / | / |
| P8R2 | / | / |

TABLE 10

| | conic coefficients | aspheric coefficients | | | | |
|---|---|---|---|---|---|---|
| | k | A4 | A6 | A8 | A10 | A12 |
| R1 | / | / | / | / | / | / |
| R2 | / | / | / | / | / | / |
| R3 | / | / | / | / | / | / |
| R4 | / | / | / | / | / | / |
| R5 | 8.2388E+00 | −4.7605E−04 | −1.5285E−05 | 6.7999E−07 | −6.7779E−08 | 2.0500E−09 |
| R6 | −1.5012E−01 | 3.0849E−05 | −2.9007E−06 | 3.7222E−07 | −2.3188E−08 | 1.0089E−09 |
| R7 | / | / | / | / | / | / |
| R8 | / | / | / | / | / | / |
| R9 | / | / | / | / | / | / |
| R10 | / | / | / | / | / | / |
| R11 | 1.8275E+01 | 9.3322E−05 | 1.3877E−05 | −5.9836E−08 | 3.1466E−11 | −2.1374E−10 |
| R12 | −9.0000E+01 | 4.6139E−04 | 1.6877E−05 | 1.3448E−07 | −3.5222E−09 | 1.0540E−10 |
| R13 | / | / | / | / | / | / |
| R14 | / | / | / | / | / | / |
| R15 | / | / | / | / | / | / |
| R16 | | / | / | / | / | / |

| | conic coefficients | aspheric coefficients | | | | |
|---|---|---|---|---|---|---|
| | k | A14 | A16 | A18 | A20 | / |
| R1 | / | / | / | / | / | / |
| R2 | / | / | / | / | / | / |
| R3 | / | / | / | / | / | / |
| R4 | / | / | / | / | / | / |
| R5 | 8.2388E+00 | −3.5635E−11 | 3.4356E−13 | −1.3188E−15 | −2.2252E−15 | / |
| R6 | −1.5012E−01 | −4.1172E−12 | −4.4906E−13 | −1.7248E−14 | 9.7010E−16 | / |
| R7 | / | / | / | / | / | / |
| R8 | / | / | / | / | / | / |
| R9 | / | / | / | / | / | / |
| R10 | / | / | / | / | / | / |
| R11 | 1.8275E+01 | 2.2834E−12 | 7.0198E−14 | −1.1661E−15 | −8.0521E−17 | / |
| R12 | −9.0000E+01 | −4.7993E−12 | −6.0343E−14 | 4.8322E−15 | −6.9650E−17 | / |
| R13 | / | / | / | / | / | / |
| R14 | / | / | / | / | / | / |
| R15 | / | / | / | / | / | / |
| R16 | / | / | / | / | / | / |

Table 11 and Table 12 respectively show the design data of the inflection point and stationary point of each lens of the camera optical lens 30 in the third embodiment of the present disclosure.

TABLE 11

| | The number of inflection points | the location 1 of inflection point |
|---|---|---|
| P1R1 | / | / |
| P1R2 | / | / |
| P2R1 | / | / |

TABLE 12

| | the number of stationary points |
|---|---|
| P1R1 | / |
| P1R2 | / |
| P2R1 | / |
| P2R2 | / |
| P3R1 | / |
| P3R2 | / |
| P4R1 | / |
| P4R2 | / |
| P5R1 | / |
| P5R1 | / |

TABLE 12-continued

| | the number of stationary points |
|---|---|
| P6R2 | / |
| P6R1 | |
| P7R1 | / |
| P7R2 | / |
| P8R1 | / |
| P8R2 | / |

Table 21, which appears later, shows the various values in the third embodiment, and the values corresponding with the parameters which are already fixed in the conditions.

Figure 10:
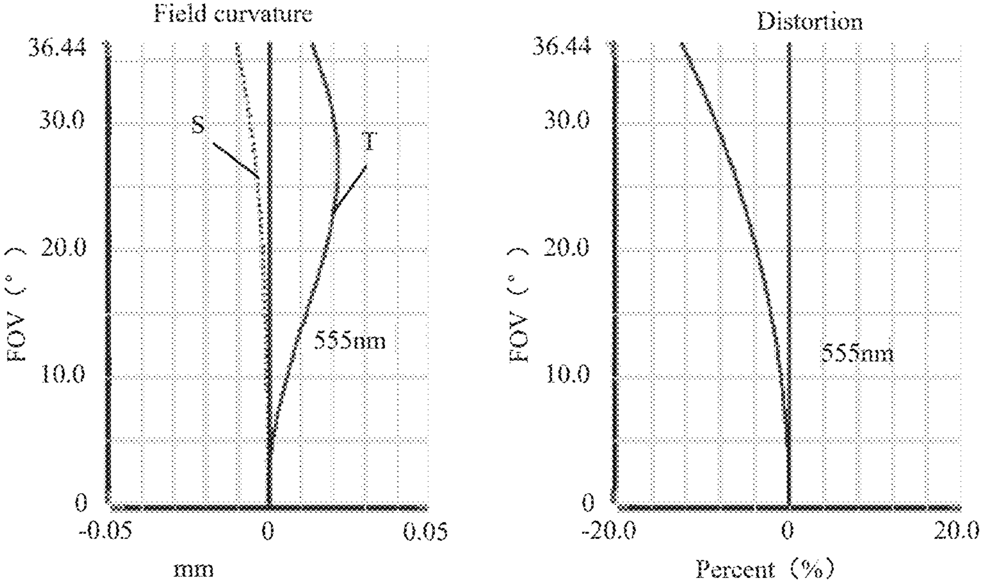
FIG. 10 presents a schematic diagram of the field curvature and distortion of the camera optical lens shown in FIG. 9.
Figure 11:
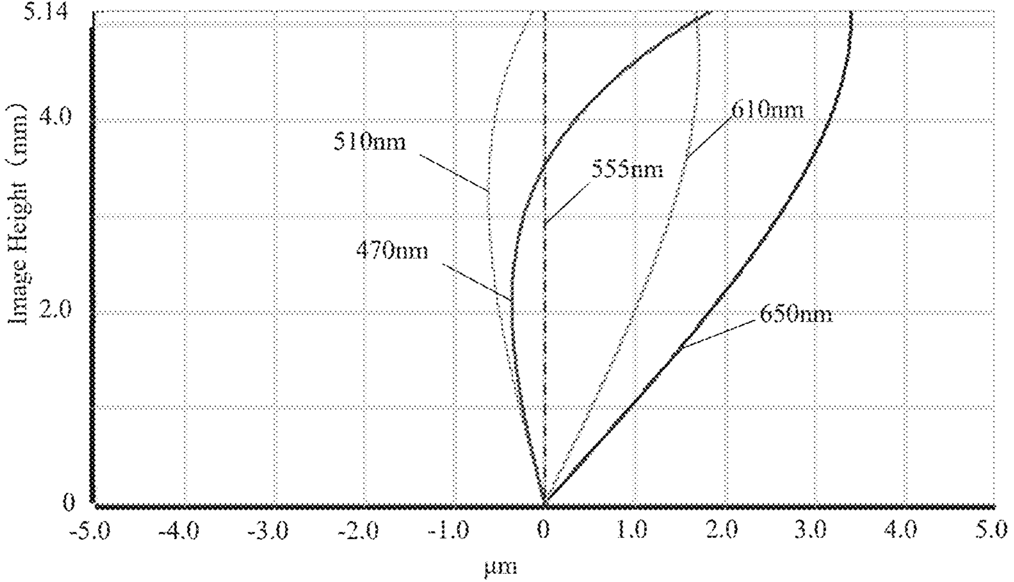
FIG. 11 shows the lateral color of the camera optical lens shown in in FIG. 9.
Figure 12:
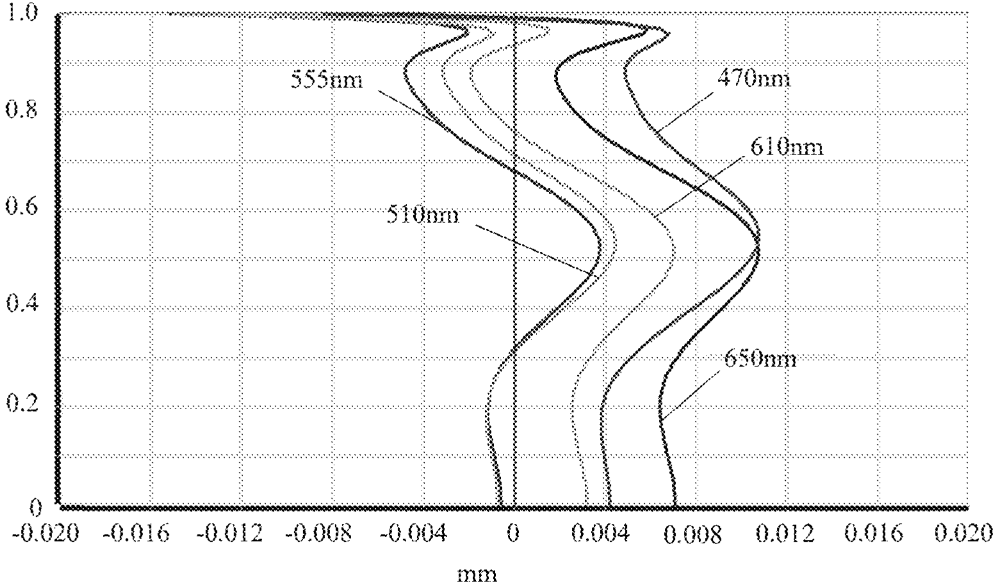
FIG. 12 shows the longitudinal aberration of the camera optical lens shown in FIG. 9.

FIG. 10 shows the schematic diagram of the field curvature and distortion after light with a wavelength of 555 nm passes through the camera optical lens 30 in the third embodiment. FIG. 11 shows the lateral color schematic diagram after light with wavelengths of 470 nm, 510 nm, 555 nm, 610 nm and 650 nm passes through the camera optical lens 30 in the third embodiment. FIG. 12 shows the longitudinal aberration after light with wavelengths of 470 nm, 510 nm, 555 nm, 610 nm and 650 nm passes through the camera optical lens 30 in the third embodiment.

As shown in Table 21, the third embodiment satisfies the various conditions.

In this embodiment, the pupil entering diameter (ENPD) of the camera optical lens 30 is 4.482 mm, the full vision field image height (IH) is 5.139 mm, and the vision field angle (FOV) in the diagonal direction is 72.88°. The camera optical lens 30 can meet the design requirements of large aperture and miniaturization, and chromatic aberrations on-axis and chromatic aberrations off-axis are adequately corrected. And the camera optical lens 30 has excellent optical characteristics.

Fourth Embodiment

Figure 13:
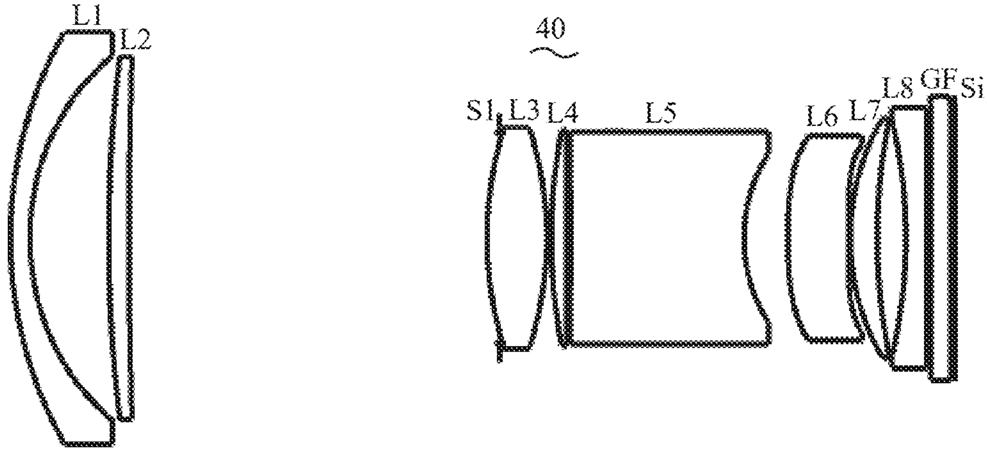
FIG. 13 is a schematic diagram of a camera optical lens in accordance with a fourth embodiment of the present disclosure.

FIG. 13 shows the camera optical lens 40 in the fourth embodiment of the present disclosure. The fourth embodiment is basically the same as the first embodiment, the meaning of its symbols is the same as that of the first embodiment, in the following, only the differences are described.

In this embodiment, the first lens of L1 has a convex image side surface at the proximal axis. The seventh lens L7 has a concave image side surface at the proximal axis. The eighth lens L8 has a convex image side surface at the proximal axis.

Table 13 and table 14 show the design data of the camera optical lens 40 in the fourth embodiment of the present disclosure.

TABLE 13

| | R | | d | | nd | | vd |
|---|---|---|---|---|---|---|---|
| S1 | ∞ | d0= | −21.942 | | | | |
| R1 | 15.913 | d1= | 0.871 | nd1 | 1.5891 | vd1 | 61.25 |
| R2 | 9.438 | d2= | 3.529 | | | | |
| R3 | 55.161 | d3= | 0.922 | nd2 | 1.7552 | vd2 | 27.55 |
| R4 | 221.022 | d4= | 16.037 | | | | |
| R5 | 13.034 | d5= | 2.688 | nd3 | 1.6192 | vd3 | 63.85 |
| R6 | −12.369 | d6= | 0.199 | | | | |
| R7 | 21.295 | d7= | 0.500 | nd4 | 1.4970 | vd4 | 81.59 |
| R8 | −3796.563 | d8= | 0.079 | | | | |
| R9 | −341.635 | d9= | 7.764 | nd5 | 1.7618 | vd5 | 26.61 |
| R10 | 6.062 | d10= | 1.970 | | | | |
| R11 | 25.554 | d11= | 2.710 | nd6 | 1.8513 | vd6 | 40.10 |
| R12 | −445.514 | d12= | 0.080 | | | | |
| R13 | 9.087 | d13= | 1.010 | nd7 | 1.7340 | vd7 | 51.49 |
| R14 | 22.081 | d14= | 1.077 | | | | |
| R15 | −19.032 | d15= | 0.921 | nd8 | 2.1042 | vd8 | 17.02 |
| R16 | −2545625.146 | d16= | 0.198 | | | | |
| R17 | ∞ | d17= | 0.900 | ndg | 1.5168 | vgd | 64.21 |
| R18 | ∞ | d18= | 0.199 | | | | |

TABLE 14

| | conic coefficients | aspheric coefficients | | | | |
|---|---|---|---|---|---|---|
| | k | A4 | A6 | A8 | A10 | A12 |
| R1 | / | / | / | / | / | / |
| R2 | / | / | / | / | / | / |
| R3 | / | / | / | / | / | / |
| R4 | / | / | / | / | / | / |
| R5 | 5.3173E+00 | −3.9655E−04 | −1.3960E−05 | 7.1421E−07 | −6.8632E−08 | 1.8423E−09 |
| R6 | −6.6883E−01 | 2.2442E−04 | −5.4342E−06 | 2.9909E−07 | −2.8813E−08 | 8.2019E−10 |
| R7 | / | / | / | / | / | / |
| R8 | / | / | / | / | / | / |
| R9 | / | / | / | / | / | / |
| R10 | / | / | / | / | / | / |
| R11 | 1.1023E+01 | 1.6180E−03 | 1.1849E−05 | −2.0244E−08 | −1.3678E−08 | −1.2432E−09 |
| R12 | −8.8142E+01 | 1.8916E−03 | 2.6446E−05 | 2.3877E−06 | −2.9583E−08 | −1.5009E−10 |
| R13 | / | / | / | / | / | / |
| R14 | / | / | / | / | / | / |
| R15 | / | / | / | / | / | / |
| R16 | | / | / | / | / | / |

| | conic coefficients | aspheric coefficients | | | | |
|---|---|---|---|---|---|---|
| | k | A14 | A16 | A18 | A20 | / |
| R1 | / | / | / | / | / | / |
| R2 | / | / | / | / | / | / |
| R3 | / | / | / | / | / | / |
| R4 | / | / | / | / | / | / |
| R5 | 5.3173E+00 | −4.3182E−11 | 6.0836E−13 | 4.0757E−14 | −2.6624E−15 | / |
| R6 | −6.6883E−01 | −5.0054E−12 | −8.5748E−14 | −6.2726E−15 | −7.0490E−17 | / |

TABLE 14-continued

| | | | | | | |
|---|---|---|---|---|---|---|
| R7 | / | / | / | / | / | / |
| R8 | / | / | / | / | / | / |
| R9 | / | / | / | / | / | / |
| R10 | / | / | / | / | / | / |
| R11 | 1.1023E+01 | 2.8152E−11 | 2.6030E−12 | −2.9068E−16 | −2.3510E−15 | / |
| R12 | −8.8142E+01 | 9.1714E−11 | −2.6529E−12 | −6.7304E−13 | 3.5102E−14 | / |
| R13 | / | / | / | / | / | / |
| R14 | / | / | / | / | / | / |
| R15 | / | / | / | / | / | / |
| R16 | / | / | / | / | / | / |

Table 15 and Table 16 respectively show the design data of the inflection point and stationary point of each lens of the camera optical lens 40 in the fourth embodiment of the present disclosure.

TABLE 15

| | The number of inflection points | the location 1 of inflection point |
|---|---|---|
| P1R1 | / | / |
| P1R2 | / | / |
| P2R1 | / | / |
| P2R2 | / | / |
| P3R1 | 1 | 4.165 |
| P3R2 | / | / |
| P4R1 | / | / |
| P4R2 | / | / |
| P5R1 | / | / |
| P5R2 | / | / |
| P6R1 | / | / |
| P6R2 | 1 | 0.315 |
| P7R1 | / | / |
| P7R2 | / | / |
| P8R1 | / | / |
| P8R2 | / | / |

TABLE 16

| | the number of stationary points | the location 1 of stationary point |
|---|---|---|
| P1R1 | / | / |
| P1R2 | / | / |
| P2R1 | / | / |
| P2R2 | / | / |
| P3R1 | / | / |
| P3R2 | / | / |
| P4R1 | / | / |
| P4R2 | / | / |
| P5R1 | / | / |
| P5R2 | / | / |
| P6R1 | / | / |
| P6R2 | 1 | 0.545 |
| P7R1 | / | / |
| P7R2 | / | / |
| P8R1 | / | / |
| P8R2 | / | / |

Table 21, which appears later, shows the various values in the fourth embodiment, and the values corresponding with the parameters which are already fixed in the conditions.

Figure 14:
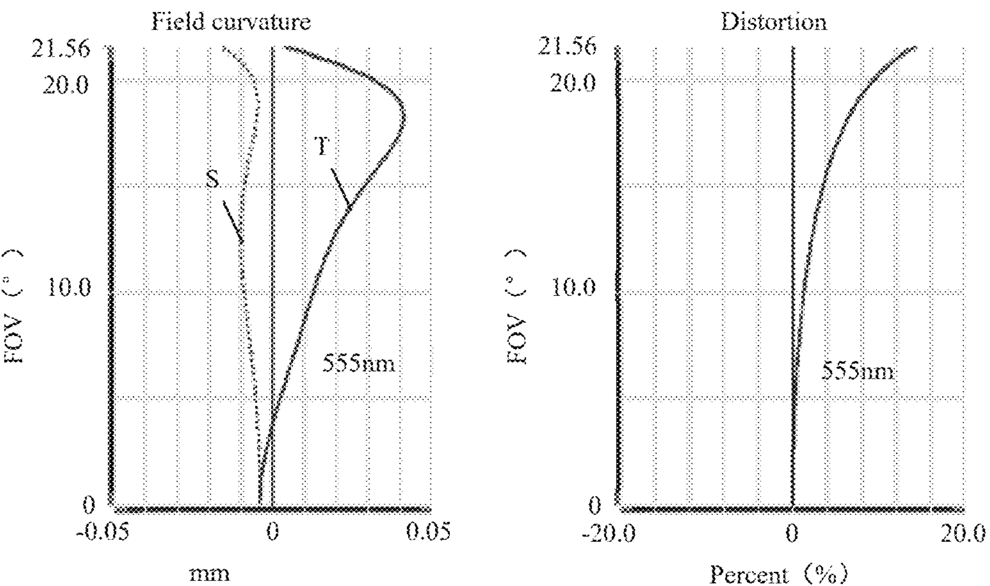
FIG. 14 presents a schematic diagram of the field curvature and distortion of the camera optical lens shown in FIG. 13.
Figure 15:
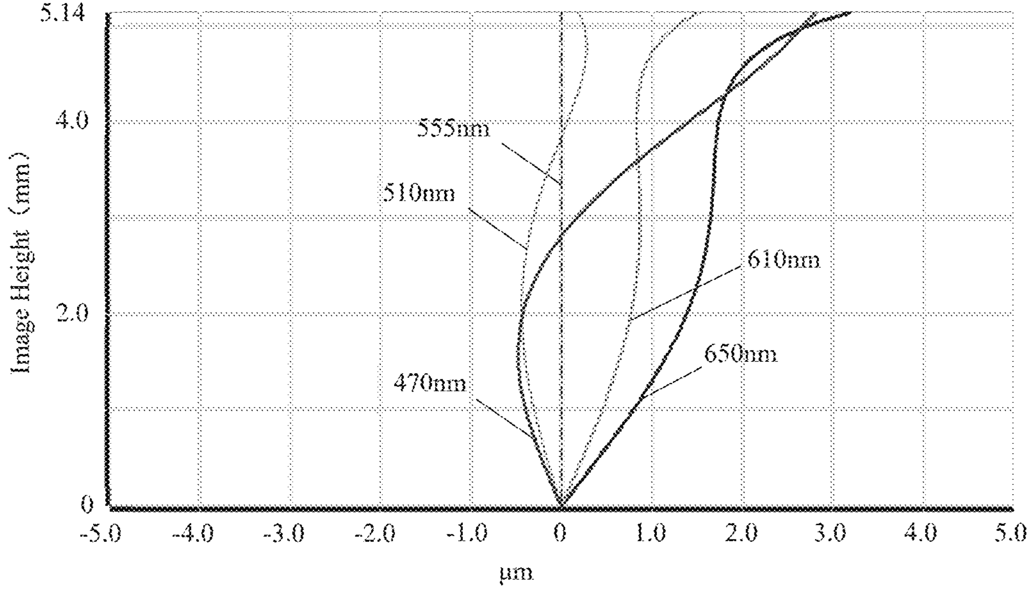
FIG. 15 shows the lateral color of the camera optical lens shown in FIG. 13.
Figure 16:
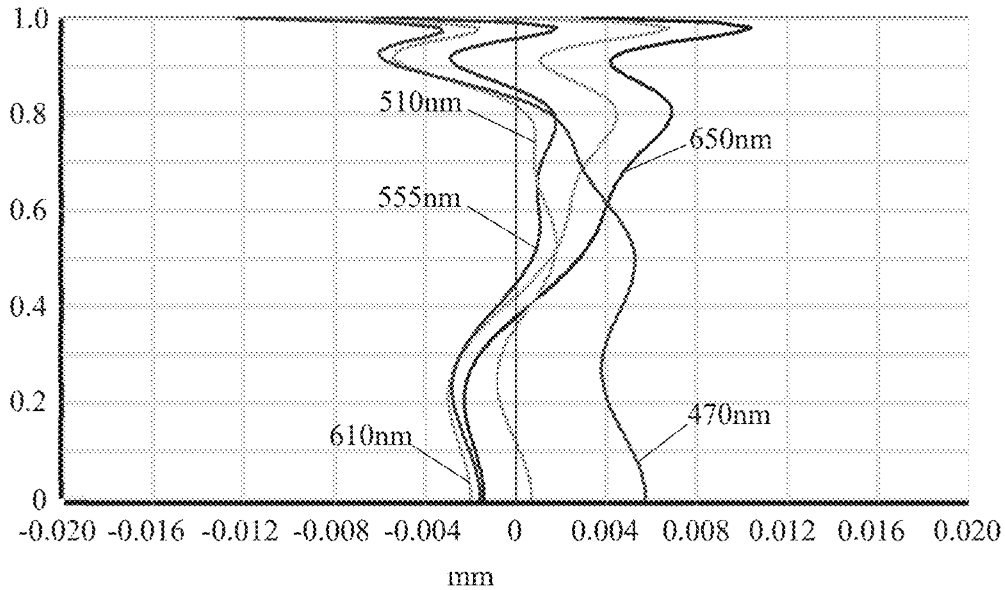
FIG. 16 shows the longitudinal aberration of the camera optical lens shown in FIG. 13.

FIG. 14 shows the schematic diagram of the field curvature and distortion after light with a wavelength of 555 nm passes through the camera optical lens 40 in the fourth embodiment. FIG. 15 shows the lateral color schematic diagram after light with wavelengths of 470 nm, 510 nm, 555 nm, 610 nm and 650 nm passes through the camera optical lens 40 in the fourth embodiment. FIG. 16 shows the longitudinal aberration after light with wavelengths of 470 nm, 510 nm, 555 nm, 610 nm and 650 nm passes through the camera optical lens 40 in the fourth embodiment.

As shown in Table 21, the fourth embodiment satisfies the various conditions.

In this embodiment, the pupil entering diameter (ENPD) of the camera optical lens 40 is 6.915 mm, the full vision field image height (IH) is 5.139 mm, and the vision field angle (FOV) in the diagonal direction is 43.13°. The camera optical lens 40 can meet the design requirements of large aperture and miniaturization, and chromatic aberrations on-axis and chromatic aberrations off-axis are adequately corrected. And the camera optical lens 40 has excellent optical characteristics.

A Contrast Embodiment

Figure 17:
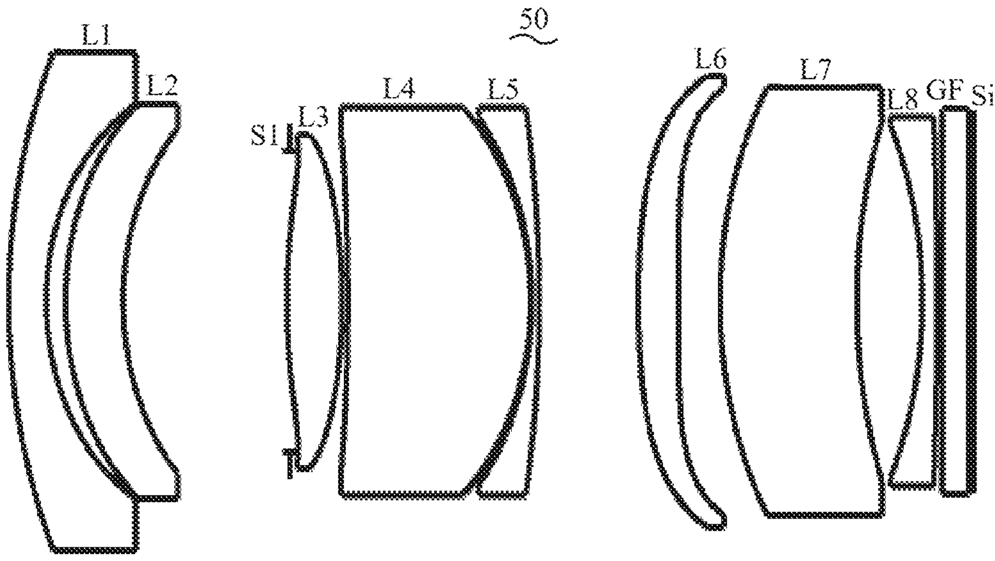
FIG. 17 is a schematic diagram of a camera optical lens in accordance with a comparative embodiment of the present disclosure.

FIG. 17 shows the camera optical lens 50 in the contrast embodiment. The meaning of symbols in the contrast embodiment is the same as the first embodiment. Only the differences are described below.

Table 17 and table 18 show the design data of the camera optical lens 50 in the contrast embodiment.

TABLE 17

| | R | | d | | nd | | vd |
|---|---|---|---|---|---|---|---|
| S1 | ∞ | d0= | −9.752 | | | | |
| R1 | 15.235 | d1= | 1.300 | nd1 | 1.5891 | vd1 | 61.25 |
| R2 | 6.090 | d2= | 0.665 | | | | |
| R3 | 6.872 | d3= | 2.000 | nd2 | 1.7552 | vd2 | 27.55 |
| R4 | 6.631 | d4= | 5.677 | | | | |
| R5 | 14.259 | d5= | 1.919 | nd3 | 1.6192 | vd3 | 63.85 |
| R6 | −12.944 | d6= | 0.200 | | | | |
| R7 | −43.180 | d7= | 6.330 | nd4 | 1.4970 | vd4 | 81.59 |
| R8 | −6.956 | d8= | 0.050 | | | | |
| R9 | −7.516 | d9= | 0.250 | nd5 | 1.7618 | vd5 | 26.61 |
| R10 | −29.156 | d10= | 3.439 | | | | |
| R11 | 20.835 | d11= | 1.381 | nd6 | 1.8513 | vd6 | 40.10 |
| R12 | 599.901 | d12= | 1.450 | | | | |
| R13 | 10.933 | d13= | 4.744 | nd7 | 1.7340 | vd7 | 51.49 |
| R14 | 13.833 | d14= | 2.271 | | | | |
| R15 | −10.674 | d15= | 0.500 | nd8 | 1.8467 | vd8 | 23.79 |
| R16 | −123.659 | d16= | 0.200 | | | | |
| R17 | ∞ | d17= | 0.900 | ndg | 1.5168 | vgd | 64.21 |
| R18 | ∞ | d18= | 0.200 | | | | |

TABLE 18

| | conic coefficients | aspheric coefficients | | | | |
|---|---|---|---|---|---|---|
| | k | A4 | A6 | A8 | A10 | A12 |
| R1 | / | / | / | / | / | / |
| R2 | / | / | / | / | / | / |
| R3 | / | / | / | / | / | / |
| R4 | / | / | / | / | / | / |
| R5 | 7.1097E+00 | −7.4369E−04 | 1.5427E−05 | −2.4480E−06 | −6.1634E−08 | 6.1381E−09 |
| R6 | 1.2180E+00 | −1.2876E−04 | −1.7511E−05 | 9.1781E−07 | −6.1760E−08 | −8.2329E−10 |
| R7 | / | / | / | / | / | / |
| R8 | / | / | / | / | / | / |
| R9 | / | / | / | / | / | / |
| R10 | / | / | / | / | / | / |
| R11 | 9.2365E+00 | 4.9251E−04 | 4.6603E−06 | 6.8843E−08 | 4.9162E−10 | −1.3981E−10 |
| R12 | 8.2396E+01 | 7.6077E−04 | 1.3807E−05 | −1.1166E−07 | 6.1183E−09 | 6.6475E−11 |
| R13 | / | / | / | / | / | / |
| R14 | / | / | / | / | / | / |
| R15 | / | / | / | / | / | / |
| R16 | | / | / | / | / | / |

| | conic coefficients | aspheric coefficients | | | | |
|---|---|---|---|---|---|---|
| | k | A14 | A16 | A18 | A20 | / |
| R1 | / | / | / | / | / | / |
| R2 | / | / | / | / | / | / |
| R3 | / | / | / | / | / | / |
| R4 | / | / | / | / | / | / |
| R5 | 7.1097E+00 | 2.1801E−11 | −6.4105E−12 | −3.6243E−13 | 4.1102E−16 | / |
| R6 | 1.2180E+00 | 2.0855E−11 | 3.9820E−12 | 1.8157E−14 | −1.4529E−14 | / |
| R7 | / | / | / | / | / | / |
| R8 | / | / | / | / | / | / |
| R9 | / | / | / | / | / | / |
| R10 | / | / | / | / | / | / |
| R11 | 9.2365E+00 | 4.3988E−12 | 4.2025E−15 | −1.8140E−15 | 4.5558E−17 | / |
| R12 | 8.2396E+01 | −1.0447E−12 | −1.3425E−13 | 3.9939E−16 | 1.7040E−16 | / |
| R13 | / | / | / | / | / | / |
| R14 | / | / | / | / | / | / |
| R15 | / | / | / | / | / | / |
| R16 | / | / | / | / | / | / |

Table 19 and Table 20 respectively show the design data of the inflection point and stationary point of each lens of the camera optical lens 50 in the contrast embodiment of the present disclosure.

TABLE 19

| | The number of inflection points | the location 1 of inflection point |
|---|---|---|
| P1R1 | / | / |
| P1R2 | / | / |
| P2R1 | / | / |
| P2R2 | / | / |
| P3R1 | 1 | 2.965 |
| P3R2 | / | / |
| P4R1 | / | / |
| P4R2 | / | / |
| P5R1 | / | / |
| P5R2 | / | / |
| P6R1 | / | / |
| P6R2 | / | / |
| P7R1 | / | / |
| P7R2 | / | / |
| P8R1 | / | / |
| P8R2 | / | / |

TABLE 20

| | the number of stationary points | the location of stationary point |
|---|---|---|
| P1R1 | / | / |
| P1R2 | / | / |
| P2R1 | / | / |
| P2R2 | / | / |
| P3R1 | 1 | 3.995 |
| P3R2 | / | / |
| P4R1 | / | / |
| P4R2 | / | / |
| P5R1 | / | / |
| P5R1 | / | / |
| P6R2 | / | / |
| P6R1 | / | / |
| P7R1 | / | / |
| P7R2 | / | / |
| P8R1 | / | / |
| P8R2 | / | / |

Figure 18:
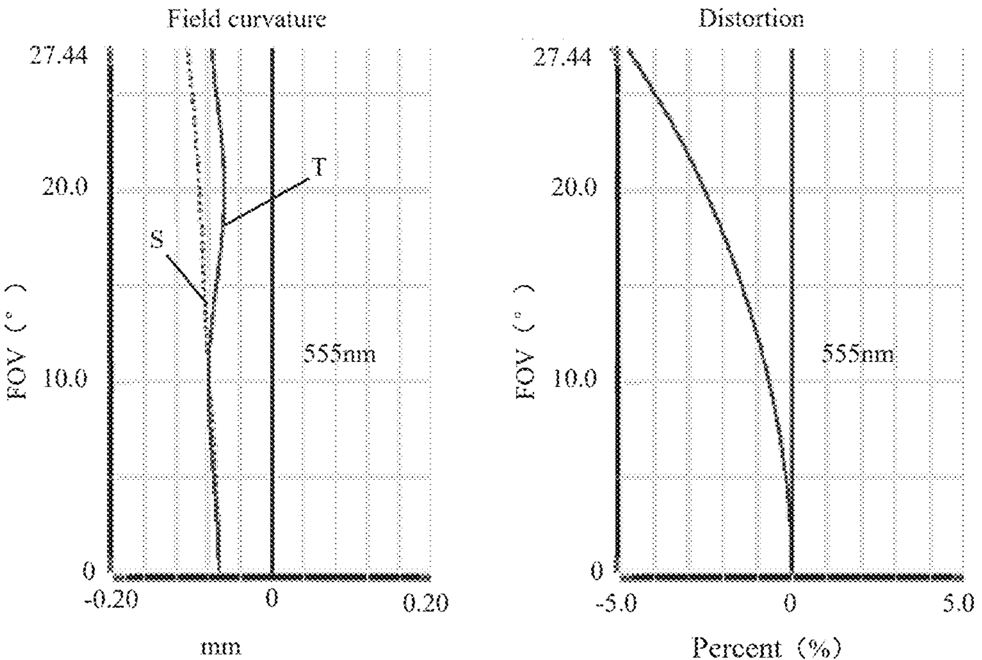
FIG. 18 presents a schematic diagram of the field curvature and distortion of the camera optical lens shown in FIG. 17.
Figure 19:
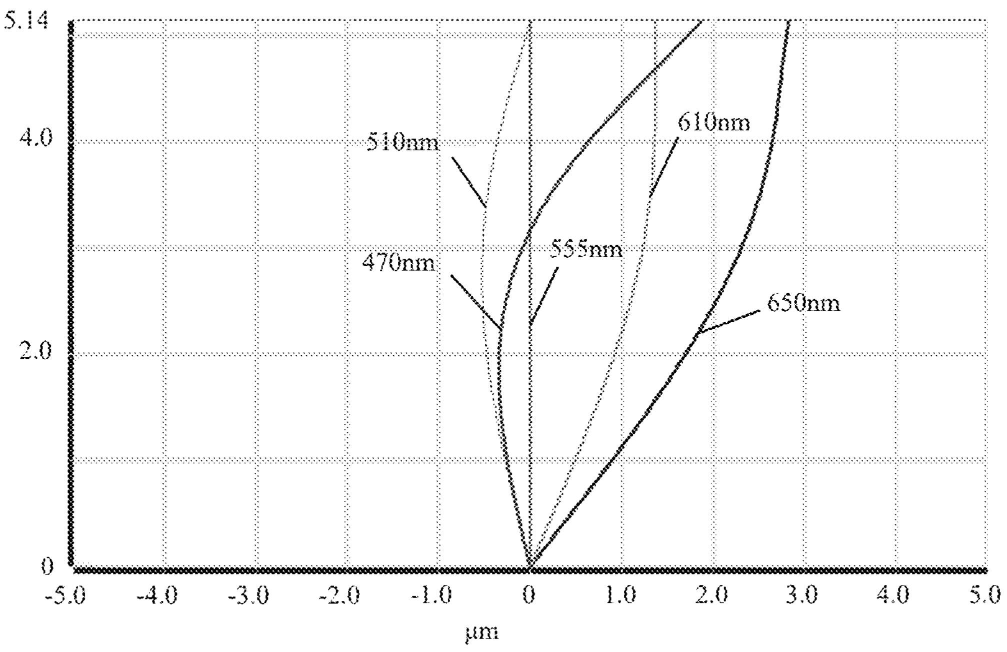
FIG. 19 shows the lateral color of the camera optical lens shown in FIG. 17.
Figure 20:
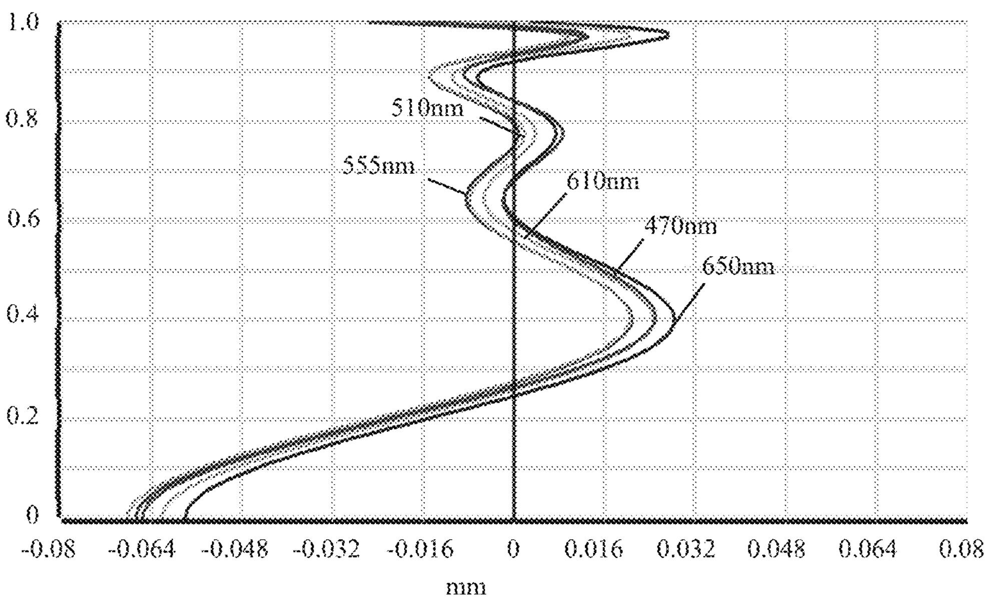
FIG. 20 shows the longitudinal aberration of the camera optical lens shown in FIG. 17.

FIG. 18 shows the schematic diagram of the field curvature and distortion after light with a wavelength of 555 nm passes through the camera optical lens 50 in the contrast embodiment. FIG. 19 shows the lateral color schematic diagram after light with wavelengths of 470 nm, 510 nm, 555 nm, 610 nm and 650 nm passes through the camera optical lens 50 in the contrast embodiment. FIG. 20 shows the longitudinal aberration after light with wavelengths of 470 nm, 510 nm, 555 nm, 610 nm and 650 nm passes through the camera optical lens 50 in the contrast embodiment.

Table 21 below shows the various values in this embodiment in accordance with the above conditions. Obviously, the camera optical lens 50 in this embodiment does not satisfy the above condition: 0.20≤R3/R4≤0.90.

In the contrast embodiment, the pupil entering diameter (ENPD) of the camera optical lens 50 is 6.283 mm, the full vision field image height (IH) is 5.139 mm, and the vision field angle (FOV) in the diagonal direction is 54.89°. The camera optical lens 50 does not meet the design requirements of large aperture, wide-angle and ultra-thin, and chromatic aberrations on-axis and chromatic aberrations off-axis are not adequately corrected.

TABLE 21

| Parameters and conditions | The first Embodiment | The second Embodiment | The third Embodiment | The fourth Embodiment | the contrast embodiment |
|---|---|---|---|---|---|
| d3/d1 | 1.488 | 2.996 | 1.011 | 1.059 | 1.538 |
| R3/R4 | 0.479 | 0.205 | 0.890 | 0.250 | 1.036 |
| f4/f3 | 1.908 | 1.441 | 1.007 | 3.991 | 1.401 |
| f6/f7 | 0.960 | 0.506 | 0.520 | 1.396 | 0.603 |
| nd8 | 1.847 | 1.847 | 1.805 | 2.104 | 1.847 |
| \|f8/f\| | 1.551 | 3.991 | 1.751 | 1.501 | 1.329 |
| (FOV*f)/IH | 122.960 | 116.021 | 112.838 | 95.345 | 110.256 |
| f | 5.937 | 7.681 | 7.956 | 11.361 | 10.324 |
| f1 | −7.404 | −10.306 | −13.273 | −41.319 | −18.127 |
| f2 | 64.443 | 48.844 | 91.369 | 96.468 | 96.288 |
| f3 | 9.761 | 10.472 | 12.042 | 10.652 | 11.229 |
| f4 | 18.384 | 15.092 | 12.126 | 42.515 | 15.733 |
| f5 | −10.328 | −9.189 | −10.304 | −7.691 | −13.268 |
| f6 | 11.93 | 26.219 | 30.016 | 28.335 | 25.211 |
| f7 | 12.262 | 51.773 | 57.733 | 20.296 | 41.8 |
| f8 | −9.578 | −30.659 | −13.934 | −17.058 | −13.723 |
| f12 | −8.547 | −13.774 | −15.291 | −75.731 | −19.263 |
| FNO | 1.64 | 1.64 | 1.64 | 1.64 | 1.64 |

The above embodiments of the present disclosure provide a detailed description of the camera optical lens. Specific examples are applied herein to illustrate the principles and embodiments of the present disclosure. The above description of the embodiments is only used to help understand the spirit and scope of present disclosure, various modifications may be made to these embodiments in terms of formality and detail, without departing from the spirit and scope of the present disclosure. In summary, the contents of the present disclosure should not be construed as a limitation of present disclosure.

What is claimed is:

1. A camera optical lens, comprising, from an object side to an image side in sequence:

a first lens;

a second lens;

a third lens;

a fourth lens;

a fifth lens;

a sixth lens;

a seventh lens;

a eighth lens;

wherein the camera optical lens satisfies the following conditions:

$$1.00 \le d3/d1 \le 3.00;$$

$$0.20 \le R3/R4 \le 0.90;$$

$$1.00 \le f4/f3 \le 4.00;$$

$$0.50 \le f6/f7 \le 1.40;$$

$$1.80 \le nd8 \le 2.20;$$

where, d1 represents a thickness on-axis of the first lens;

d3 represents a thickness on-axis of the second lens;

R3 represents a curvature radius of the object side surface of the second lens;

R4 represents a curvature radius of the image side surface of the second lens;

f3 represents a focal length of the third lens;

f4 represents a focal length of the fourth lens;

f6 represents a focal length of the sixth lens;

f7 represents a focal length of the seventh lens;

nd8 represents a refractive index of the eighth lens.

2. The camera optical lens according to claim 1, wherein the camera optical lens further satisfies the following conditions:

$$|f8/f| \le 3.00;$$

where, f8 represents a focal length of the eighth lens;

f represents a focal length of the camera optical lens.

3. The camera optical lens according to claim 1, wherein the camera optical lens has a field of view; and the camera optical lens further satisfies the following conditions:

$$(FOV * f)/IH \ge 95;$$

where,

FOV represents the field of view of the camera optical lens;

f represents a focal length of the camera optical lens;

IH represents an image height of the camera optical lens.

4. The camera optical lens according to claim 3, wherein the camera optical lens further satisfies the following conditions:

$$(FOV * f)/IH \le 125.$$

5. The camera optical lens according to claim 1, wherein the first lens has a negative refractive power, and the first lens has a concave image side surface at a proximal axis;

wherein the camera optical lens further satisfies the following conditions:

$$0.44 \leq (R1+R2)/(R1-R2) \leq 5.87;$$

$$-7.27 \leq f1/f \leq -0.83;$$

$$0.01 \leq d1/TTL \leq 0.05;$$

where,

R1 represents a curvature radius of the object side surface of the first lens;

R2 represents a curvature radius of the image side surface of the first lens;

f1 represents a focal length of the first lens;

f represents a focal length of the camera optical lens;

TTL represents a total optical length of the camera optical lens.

6. The camera optical lens according to claim 1, wherein the second lens has a positive refractive power, and the second lens has a convex object side surface at a proximal axis and a concave image side surface at a proximal axis;

wherein the camera optical lens further satisfies the following conditions:

$$-34.47 \leq (R3+R4)/(R3-R4) \leq -1.01;$$

$$3.18 \leq f2/f \leq 17.23;$$

$$0.01 \leq d3/TTL \leq 0.08;$$

where, f2 represents a focal length of the second lens;

f represents a focal length of the camera optical lens;

TTL represents a total optical length of the camera optical lens.

7. The camera optical lens according to claim 1, wherein the third lens has a positive refractive power, and the third lens has a convex object side surface at a proximal axis and a convex image side surface at a proximal axis;

wherein the camera optical lens further satisfies the following conditions:

$$0.01 \leq (R5+R6)/(R5-R6) \leq 0.62;$$

$$0.47 \leq f3/f \leq 2.47;$$

$$0.03 \leq d5/TTL \leq 0.22;$$

where,

R5 represents a curvature radius of the object side surface of the third lens;

R6 represents a curvature radius of the image side surface of the third lens;

f represents a focal length of the camera optical lens;

d5 represents a thickness on-axis of the third lens;

TTL represents a total optical length of the camera optical lens.

8. The camera optical lens according to claim 1, wherein the fourth lens has a positive refractive power, and the fourth lens has a convex object side surface at a proximal axis and a convex image side surface at a proximal axis;

wherein the camera optical lens further satisfies the following conditions:

$$-1.98 \leq (R7+R8)/(R7-R8) \leq 1.12;$$

$$0.76 \leq f4/f \leq 5.61;$$

$$0.01 \leq d7/TTL \leq 0.23;$$

where,

R7 represents a curvature radius of the object side surface of the fourth lens;

R8 represents a curvature radius of the image side surface of the fourth lens;

f represents a focal length of the camera optical lens;

d7 represents a thickness on-axis of the fourth lens;

TTL represents a total optical length of the camera optical lens.

9. The camera optical lens according to claim 1, wherein the fifth lens has a negative refractive power, and the fifth lens has a concave object side surface at a proximal axis and a concave image side surface at a proximal axis;

wherein the camera optical lens further satisfies the following conditions:

$$-0.99 \leq (R9+R10)/(R9-R10) \leq 1.45;$$

$$-3.48 \leq f5/f \leq -0.45;$$

$$0.00 \leq d9/TTL \leq 0.28;$$

where,

R9 represents a curvature radius of the object side surface of the fifth lens;

R10 represents a curvature radius of the image side surface of the fifth lens;

f represents a focal length of the camera optical lens;

d9 represents a thickness on-axis of the fifth lens;

TTL represents a total optical length of the camera optical lens.

10. The camera optical lens according to claim 1, wherein the sixth lens has a positive refractive power, and the sixth lens has a convex object side surface at a proximal axis;

wherein the camera optical lens further satisfies the following conditions:

$$-2.00 \leq (R11+R12)/(R11-R12) \leq 0.22;$$

$$1.00 \leq f6/f \leq 5.66;$$

$$0.01 \leq d11/TTL \leq 0.14;$$

where,

R11 represents a curvature radius of the object side surface of the sixth lens;

R12 represents a curvature radius of the image side surface of the sixth lens;

f represents a focal length of the camera optical lens;

d11 represents a thickness on-axis of the sixth lens;

TTL represents a total optical length of the camera optical lens.

11. The camera optical lens according to claim 1, wherein the seventh lens has a positive refractive power, and the seventh lens has a convex object side surface at a proximal axis;

wherein the camera optical lens further satisfies the following conditions:

$$-11.16 \leq (R13+R14)/(R13-R14) \leq -0.01;$$

$$0.89 \leq f7/f \leq 10.88;$$

$$0.01 \leq d13/TTL \leq 0.30;$$

where,

R13 represents a curvature radius of the object side surface of the seventh lens;

R14 represents a curvature radius of the image side surface of the seventh lens;

f represents a focal length of the camera optical lens;

d13 represents a thickness on-axis of the seventh lens;

TTL represents a total optical length of the camera optical lens.

12. The camera optical lens according to claim 1, wherein the eighth lens has a negative refractive power, and the eighth lens has a concave object side surface at a proximal axis;

wherein the camera optical lens further satisfies the following conditions:

$$-12.50 \leq (R15+R16)/(R15-R16) \leq 0.02;$$

$$0.01 \leq d15/TTL \leq 0.05;$$

where,

R15 represents a curvature radius of the object side surface of the eighth lens;

R16 represents a curvature radius of the image side surface of the eighth lens;

d15 represents a thickness on-axis of the eighth lens;

TTL represents a total optical length of the camera optical lens.

13. The camera optical lens according to claim 1, wherein the first lens is made of glass material.

14. The camera optical lens according to claim 1, wherein the second lens is made of glass material.

15. The camera optical lens according to claim 1, wherein the third lens is made of glass material.

16. The camera optical lens according to claim 1, wherein the fourth lens is made of glass material.

17. The camera optical lens according to claim 1, wherein the fifth lens is made of glass material.

18. The camera optical lens according to claim 1, wherein the sixth lens is made of glass material.

19. The camera optical lens according to claim 1, wherein the seventh lens is made of glass material.

20. The camera optical lens according to claim 1, wherein the eighth lens is made of glass material.

* * * * *